(12) United States Patent
Kling et al.

(10) Patent No.: US 12,527,429 B2
(45) Date of Patent: Jan. 20, 2026

(54) METHOD FOR VISUALIZING PROGRAMS AND A COOKING DEVICE USING SAME

(71) Applicant: RATIONAL AG, Landsberg am Lech (DE)

(72) Inventors: Judith Kling, Landsberg am Lech (DE); Tanja Agapkin, Landsberg am Lech (DE)

(73) Assignee: Rational AG, Landsberg am Lech (DE)

( * ) Notice: Subject to any disclaimer, the term of this patent is extended or adjusted under 35 U.S.C. 154(b) by 1071 days.

(21) Appl. No.: 17/487,358

(22) Filed: Sep. 28, 2021

(65) Prior Publication Data
US 2022/0007884 A1    Jan. 13, 2022

Related U.S. Application Data

(63) Continuation-in-part of application No. 16/026,701, filed on Jul. 3, 2018, now abandoned, which is a continuation-in-part of application No. 14/964,302, filed on Dec. 9, 2015, now abandoned, which is a continuation-in-part of application No. 13/816,930, filed as application No. PCT/EP2011/063960 on Aug. 12, 2011, now abandoned, said application No. 16/026,701 is a continuation-in-part of application (Continued)

(30) Foreign Application Priority Data

Jan. 27, 2009  (EP) ...................................... 09001111
Aug. 13, 2010  (DE) ..................... 10 2010 036 988.8

(51) Int. Cl.
*A47J 36/32* (2006.01)
*G06F 3/0482* (2013.01)
*G06F 3/0488* (2022.01)

(52) U.S. Cl.
CPC ............ *A47J 36/32* (2013.01); *G06F 3/0482* (2013.01); *G06F 3/0488* (2013.01)

(58) Field of Classification Search
CPC ...................................................... A47J 36/32
See application file for complete search history.

(56) References Cited

U.S. PATENT DOCUMENTS 4,309,584 A * 1/1982 Terakami ............. H05B 6/6482
                                                       219/710
5,426,580 A * 6/1995 Yoshida ................. A21B 7/005
                                                        99/332

(Continued)

*Primary Examiner* — Steven N Leff
(74) *Attorney, Agent, or Firm* — Jones Day

(57) ABSTRACT

A cooking device including a processor for executing a method and the method for displaying one or more cooking programs corresponding to cooking one or more foods includes displaying a virtual token board including a time scale which provides time information indicating a time when the one or more foods are cooking or will be cooked, and a space scale which provides levels indicating a location where the one or more foods are cooking or will be cooked, displaying one or more virtual tokens corresponding to the one or more cooking programs, and providing a leading virtual climate token in response at least one of the one or more virtual tokens being selected which provides information on cooking a plurality of food products of the one or more foods in a single cooking chamber with at least an overlap in cooking time.

17 Claims, 19 Drawing Sheets

Related U.S. Application Data

No. 12/695,106, filed on Jan. 27, 2010, now abandoned.

(56) References Cited

U.S. PATENT DOCUMENTS

| | | | | |
|---|---|---|---|---|
| 6,486,453 B1* | 11/2002 | Bales | ............... | H05B 6/6435 |
| | | | | 219/400 |
| 2003/0161922 A1* | 8/2003 | Hillmann | ............... | F24C 7/082 |
| | | | | 426/523 |
| 2004/0056761 A1* | 3/2004 | Vaseloff | ............... | A47F 10/06 |
| | | | | 340/309.16 |
| 2006/0185810 A1* | 8/2006 | Juergens | ............... | F24C 15/16 |
| | | | | 162/234 |
| 2009/0274802 A1* | 11/2009 | Kling | ............... | F24C 7/08 |
| | | | | 426/523 |
| 2010/0227029 A1* | 9/2010 | Ernst | ............... | F24C 7/08 |
| | | | | 99/473 |
| 2016/0296055 A1* | 10/2016 | Schilling | ............... | F24C 7/085 |

* cited by examiner

METHOD FOR VISUALIZING PROGRAMS AND A COOKING DEVICE USING SAME

CROSS-REFERENCE TO RELATED APPLICATIONS

This application is a continuation-in-part of U.S. patent application Ser. No. 16/026,701, filed Jul. 3, 2018, which is a continuation-in-part of U.S. patent application Ser. No. 12/695,106, filed Jan. 27, 2010, which claims the benefit of foreign priority to European Patent Application No. 09001111.5, filed Jan. 27, 2009, and this application a continuation-in-part of U.S. patent application Ser. No. 14/964,302, filed Dec. 9, 2015, which is a continuation-in-part of U.S. patent application Ser. No. 13/816,930, filed May 8, 2013, which is a National Stage Entry of International Patent Application No. PCT/EP2011/063960, filed Aug. 12, 2011, which claims the benefit of foreign priority to German Patent Application No. DE 10 2010 036 988, filed Aug. 13, 2010, each of which is hereby incorporated by reference herein in its entirety for all purposes.

BACKGROUND OF THE INVENTION

1. Field of the Invention

The following description relates to a method for visualizing programs for cooking devices, and a cooking device for implementing such a method. In an example, colored regions are provided on a display to assist a user in scheduling and arranging items.

2. Description of Related Art

Cooking devices with which an input device and a display device are at least partially combined are well known from the prior art. For example, an operating element for a cooking device comprising a touch screen with a display (having at least one touch element which can be actuated, the actuation of which enables a switching over of the display to an upstream or downstream level of an operating menu) is described in DE 20 2004 018 719 U1.

A method for implementing a cooking procedure in a cooking area of a cooking device is described in EP 1 989 978 A1 which is based on a plurality of parameters which can be entered via an input device of the cooking device, in which via the parameters, the food to be cooked or cooking programs, and start or end times for cooking, as well as cooking parameters, can be selected. For example, when a plurality of cooking programs from an output device are selected, the user can enter when and which food to be cooked should be loaded into a cooking area and removed from the cooking area, wherein a series of cooking parameters, such as the energy consumed by a cooking device, a required time or a loss in weight of each item of food to be cooked can be optimized.

DE 10 2006 008 096 A1 describes a method for implementing cooking programs in a cooking area of a cooking device for different foods which have been inserted into a cooking area, which are to be cooked at different points in time and at a plurality of treatment levels, wherein at a start time point, the treatment levels which are to be loaded with food to be cooked at a later point in time are selected and a cooking area climate is set depending on the loading. In the known method, signals can be emitted by the cooking device for a removal time of an item of food to be cooked or several items of food to be cooked.

DE 10 2006 039 235 A1 describes a method for displaying operating menus for cooking devices with an operating device, as well as a cooking device with such an operating device, an input device and an output device, wherein the input device comprises touch switches and the output device is designed as a display for issuing image information. This method makes it possible to alter the illustrations on the output device as a result of an entry on the input device, wherein the input device and the output device can be combined in the style of a touch screen. Due to a control device in the cooking device, illustrations and symbols can be altered on the display, depending on the input.

U.S. Pat. No. 5,111,028 describes a control system for a cooking device which depending on the type of food to be cooked can recommend an optimum position of an item of food to be cooked in a cooking device. Here, an input device and an output device are used, by means of which the user can enter a plurality of items of food to be cooked or display items of food to be cooked which have been entered, and positions for a plurality of items of food to be cooked can be optimized for a rack of the cooking device in accordance with required parameters set by the user.

A method for alternating between display areas is described by EP 1 719 952 A2, which respectively depicts a cooking module such as for two pans of a cooking device. Thus, by alternating via a display device, information can be displayed relating to both pans, e.g., in the form of cooking parameters.

In DE 10 2008 057 319, not published, a method for displaying operating program stages of a cooking device is described, in which during the progress of an operating program in a cooking device, such as during cooking, an operator of the cooking device is given a precise overview of the progress of the operating program and the respective status of the program wherein each stage of an operating program, which can comprise a plurality of stages, is displayed on a display device and the respective stage of the operating program which is active or running is identified. This offers the operator important assistance in improving kitchen logistics, e.g., when planning the production and processes in a kitchen.

In DE 10 2008 032 453, not published, the use of a touch screen with the menu operation of a cooking device is described, in which different levels of the operating menu can be displayed as pages of a virtual book. When areas of the touch screen are passed over, scrolling can be introduced between different operating menus at the same or at a different hierarchy level.

A method for operating a cooking device is described in EP 1 798 479 A1, in which a selection of an item of food to be cooked is made with an assigned cooking program or at least a cooking parameter is selected with an assigned item of food to be cooked which is to be selected, and subsequently, the cooking device is loaded with the selected product. After the corresponding cooking program is started, a program name is displayed and a remaining cooking time is shown on a display device of the cooking device, and subsequently, an automated assignment of further items of food to be cooked or cooking programs which match the cooking program of the first item of food to be cooked can be implemented, depending on corresponding cooking parameters. The method is suitable for displaying to a user the assigned food to be cooked or cooking programs in a time sequence of cooking programs at required points in time, and information on a plurality of food items to be cooked which are already in the cooking device, in order that a further selection can be made, wherein a respective remaining cooking time of the selected items of food to be cooked can also be displayed.

Common to the methods of the prior art described above is the fact that a visualization of cooking programs by means of displaying a code word and/or a graphic illustration takes place. With regard to restaurant operation, however a so-called "token system" has been popular for many years. When a restaurant guest selects menu items listed in a menu, the waiter usually writes down on a notepad either the name of the item or another representative of the item, such as a number, and this note (token) is then attached to a board (token board) in a kitchen. In general, this token system has proven to be effective in the past, although it has the disadvantage that handwriting is difficult to read, notes (tokens) are lost, and the information on the notes (tokens) has to be passed on to a cooking device.

An electronic menu is for example described in DE 10 2007 040 652, not published. This enables direct communication between a restaurant guest and a cooking device.

In patent document DE 10 2008 027 597, not published, the operation of a plurality of cooking devices using the same display device is described.

SUMMARY OF THE INVENTION

In an aspect, a method for displaying one or more cooking programs corresponding to cooking one or more foods includes displaying a virtual token board including a time scale which provides time information indicating a time when the one or more foods are cooking or will be cooked, and a space scale which provides levels indicating a location where the one or more foods are cooking or will be cooked, displaying one or more virtual tokens corresponding to the one or more cooking programs, and changing one or more regions of the virtual token board to have one or more new visual characteristics in response to a user adding or proposing to add a new virtual token to the virtual token board.

The one or more new visual characteristics may include at least one of a color, a color intensity, a transparency, a texture, a hatching, a pattern, a geometric shape, an outline shape, an outline color, an outline pattern, and an outline hatching.

The changing of the one or more regions of the virtual token board to have one or more new visual characteristics may include changing the one or more regions of the virtual token board to have a maximum of two new visual characteristics.

The method may further include generating an audible or haptic signal in response to a user adding or proposing to add the new virtual token to the virtual token board.

The method may further include checking compatibility of the new virtual token with the one or more virtual tokens on the virtual token board for which corresponding cooking programs have already started, and identifying which of the already started virtual tokens are compatible with the new virtual token and which of the already started virtual tokens are incompatible with the new virtual token.

The changing of the one or more regions to have one or more new visual characteristics may include changing to a new visual characteristic a region which extends along the time scale as long as a longest of the identified incompatible already started virtual tokens.

The new visual characteristic may be a new color

The new color may be red.

The method may further include checking each level of the space scale of the virtual token board and identifying time gaps, and determining which of the identified time gaps are long enough to receive the new virtual token and which of the time gaps are too short to receive the new virtual token.

The changing of the one or more regions to have one or more new visual characteristics may further include changing to a new visual characteristic a region corresponding to the identified time gaps which are determined to be too short to receive the new virtual token.

The new visual characteristic may be a new color.

The new color may be yellow.

The method may further include checking compatibility of the new virtual token with the one or more virtual tokens on the virtual token board for which corresponding cooking programs run, at least in part, simultaneously with the identified time gaps which are determined to be long enough to receive the new virtual token, identifying which of the simultaneously running virtual tokens are compatible and which of the simultaneously running virtual tokens are incompatible, and determining which of the identified time gaps which are determined to be long enough to receive the new virtual token have one or more incompatible simultaneously running virtual tokens and which of the identified time gaps which are determined to be long enough to receive the new virtual token have no incompatible simultaneously running virtual tokens.

The changing of the one or more regions to have one or more new visual characteristics may further include changing to a new visual characteristic a region corresponding to the identified time gaps which are determined to be long enough to receive the new virtual token and determined to have one or more incompatible simultaneously running virtual tokens.

The new visual characteristic may be a new color

The new color may be yellow.

The changing of the one or more regions to have one or more new visual characteristics may further include changing to a new visual characteristic a region corresponding to the identified time gaps which are determined to be long enough to receive the new virtual token and determined to have no incompatible simultaneously running virtual tokens.

The new visual characteristic may be a new color

The new color may be green.

The method may further include displaying a preview of tokens being shifted in response to a user placing the new virtual token above the region corresponding to the identified time gaps which are determined to be too short to receive the new virtual token or the region corresponding to the identified time gaps which are determined to be long enough to receive the new virtual token and determined to have one or more incompatible simultaneously running virtual tokens.

The displayed preview may further include arrows which are displayed to depict a proposed shifting of the tokens being shifted.

In another aspect, a cooking device configured to run one or more cooking programs corresponding to cooking one or more foods includes a cooking compartment for cooking the one or more foods, and a processor which is configured to execute steps including causing a display of a virtual token board comprising a time scale which provides time information indicating a time when the one or more foods are cooking or will be cooked, and a space scale which provides levels indicating a location where the one or more foods are cooking or will be cooked, causing a display of one or more virtual tokens corresponding to the one or more cooking programs, and causing a change of one or more regions of the virtual token board to have one or more new visual characteristics in response to a user adding or proposing to add a new virtual token to the virtual token board.

The one or more new visual characteristics may include at least one of a color, a color intensity, a transparency, a texture, a hatching, a pattern, a geometric shape, an outline shape, an outline color, an outline pattern, and an outline hatching.

The causing of the change of the one or more regions of the virtual token board to have one or more new visual characteristics may include causing a change of the one or more regions of the virtual token board to have a maximum of two new virtual characteristics.

The processor may be further configured to execute steps including generating an audible or haptic signal in response to a user adding or proposing to add the new virtual token to the virtual token board.

The processor may be further configured to execute steps including checking compatibility of the new virtual token with the one or more virtual tokens on the virtual token board for which corresponding cooking programs have already started, and identifying which of the already started virtual tokens are compatible with the new virtual token and which of the already started virtual tokens are incompatible with the new virtual token.

The causing of the change of the one or more regions to the one or more new visual characteristics may include causing a change to a new visual characteristic of a region which extends along the time scale as long as a longest of the identified incompatible already started virtual tokens.

The new visual characteristic may be a new color.

The new color may be red.

The processor may be further configured to execute steps including checking each level of the space scale of the virtual token board and identifying time gaps, and determining which of the identified time gaps are long enough to receive the new virtual token and which of the time gaps are too short to receive the new virtual token.

The causing of the change of the one or more regions to have one or more new visual characteristics may include causing a change to a new visual characteristic of a region corresponding to the identified time gaps which are determined to be too short to receive the new virtual token.

The new visual characteristic may be a new color.

The new color may be yellow.

The processor may be further configured to execute steps including checking compatibility of the new virtual token with the one or more virtual tokens on the virtual token board for which corresponding cooking programs run, at least in part, simultaneously with the identified time gaps which are determined to be long enough to receive the new virtual token, identifying which of the simultaneously running virtual tokens are compatible with the new virtual token and which of the simultaneously running virtual tokens are incompatible with the new virtual token, and determining which of the identified time gaps which are determined to be long enough to receive the new virtual token have one or more incompatible simultaneously running virtual tokens and which of the identified time gaps which are determined to be long enough to receive the new virtual token have no incompatible simultaneously running virtual tokens.

The causing of the change of the one or more regions to have one or more new visual characteristics may include causing a change to a new visual characteristic of a region corresponding to the identified time gaps which are determined to be long enough to receive the new virtual token and determined to have one or more incompatible simultaneously running virtual tokens.

The new visual characteristic may be a new color.

The new color may be yellow.

The causing of the change of the one or more regions to have one or more new visual characteristics may include causing a change to a new visual characteristic of a region corresponding to the identified time gaps which are determined to be long enough to receive the new virtual token and determined to have no incompatible simultaneously running virtual tokens.

The new visual characteristic may be a new color.

The new color may be green.

The processor may be further configured to execute steps include displaying a preview of tokens being shifted in response to a user placing the new virtual token above the region corresponding to the identified time gaps which are determined to be too short to receive the new virtual token or the region corresponding to the identified time gaps which are determined to be long enough to receive the new virtual token and determined to have one or more incompatible simultaneously running virtual tokens.

In yet another aspect, a non-transitory computer readable medium includes program instructions for displaying one or more cooking programs corresponding to cooking one or more foods, the program instructions when executed causing a computer processor to execute steps including: displaying a virtual token board comprising a time scale which provides time information indicating a time when the one or more foods are cooking or will be cooked, and a space scale which provides levels indicating a location where the one or more foods are cooking or will be cooked, displaying one or more virtual tokens corresponding to the one or more cooking programs, and changing one or more regions of the virtual token board to one or more new colors in response to a user adding or proposing to add a new virtual token to the virtual token board.

In yet another aspect, a method for displaying one or more cooking programs corresponding to cooking one or more foods includes displaying a virtual token board including a time scale which provides time information indicating a time when the one or more foods are cooking or will be cooked, and a space scale which provides levels indicating a location where the one or more foods are cooking or will be cooked, displaying one or more virtual tokens corresponding to the one or more cooking programs, and providing a leading virtual climate token in response at least one of the one or more virtual tokens being selected which provides information on cooking a plurality of food products of the one or more foods in a single cooking chamber with at least an overlap in cooking time.

In yet another aspect, a cooking device configured to run one or more cooking programs corresponding to cooking one or more foods includes a cooking compartment for cooking the one or more foods, and a processor which is configured to execute steps including displaying a virtual token board including a time scale which provides time information indicating a time when the one or more foods are cooking or will be cooked, and a space scale which provides levels indicating a location where the one or more foods are cooking or will be cooked, displaying one or more virtual tokens corresponding to the one or more cooking programs, and providing a leading virtual climate token in response at least one of the one or more virtual tokens being selected which provides information on cooking a plurality of food products of the one or more foods in a single cooking chamber with at least an overlap in cooking time.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

Figure 1:
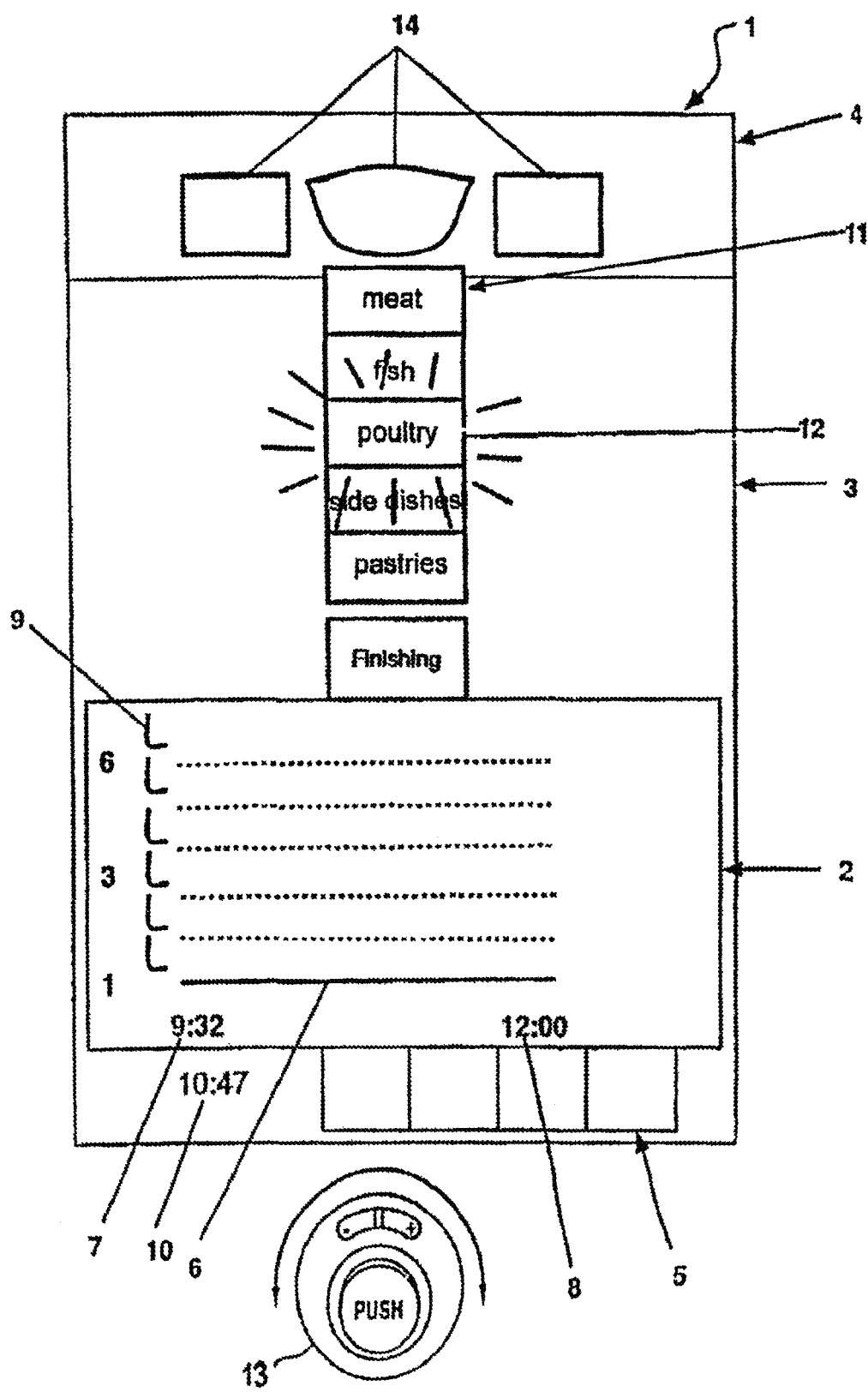
FIG. 1 shows an input and display device in the form of a touch screen of a cooking device on which a main operating menu is shown.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The input and display device shown in FIG. 1 in the form of a sensor screen or touch screen 1 of a cooking device according to the invention (not shown) comprises a first display area 2 for a virtual token board described later in detail, a second display area 3 for selecting cooking programs and a third display area 4 for selecting a mode of the cooking device. Below the first display area 2, four rectangular touch elements are located in the form of digital buttons 5, which can be assigned further functions according to certain requirements, such as a cleaning function, an additional function (e.g., an auxiliary function), a menu level alteration function or similar. Within the first display area 2, a time bar 6 is located on which a time sequence of cooking programs which are running in the cooking device can be depicted. The time bar 6 has a display of the starting time point 7 and at least one further orientation time point 8, which can for example correspond to a time point at which the items of food to be cooked should be fully cooked. A cooking device according to the invention can furthermore have several, e.g. six, insertion or loading levels 9 for items of food to be cooked, in which several cooking programs can run at least partially in parallel. The cooking device can for example by a cooking device for subjecting food to be cooked with hot air and/or steam, such as in a Self-Cooking Center® owned by the applicant.

For improved time orientation, the user can be shown the current time 10. Furthermore, it can be provided that a remaining residual cooking time of one or more cooking programs or a residual cooking time of all cooking programs (not shown) which are running in a cooking device according to the invention are shown to the user.

In the second display area 3, at least one, and in the example shown, six, different touch or selection elements 11 are provided in the main operating menu for different cooking modes of the cooking device according to the invention for selection by a user, such as "meat", "fish", "poultry", "side dishes", "pastries" or "finishing".

A required cooking mode can be selected by the user for example by touching one of the cooking mode selection elements 11. After a user has selected a cooking mode, the selection element 12 of the selected cooking mode 12 can be visually identified, e.g. by flashing a symbol for "poultry" in FIG. 1. It can be clearly seen that a plurality of further display or selection elements can be provided. A selection can for example also be made by means of a rotating head 13, wherein two arrows show the possible directions in which the rotating head 13 can be rotated. The rotating head 13 can also be a virtual rotating head.

The selection elements 11 shown for different cooking modes are those elements which can for example be displayed after the cooking device according to the invention has been switched on, after a mode has been selected via one of the display fields 14 which are located in the third display area 4, e.g. for a semi-automatic, intelligent mode.

Figure 2:
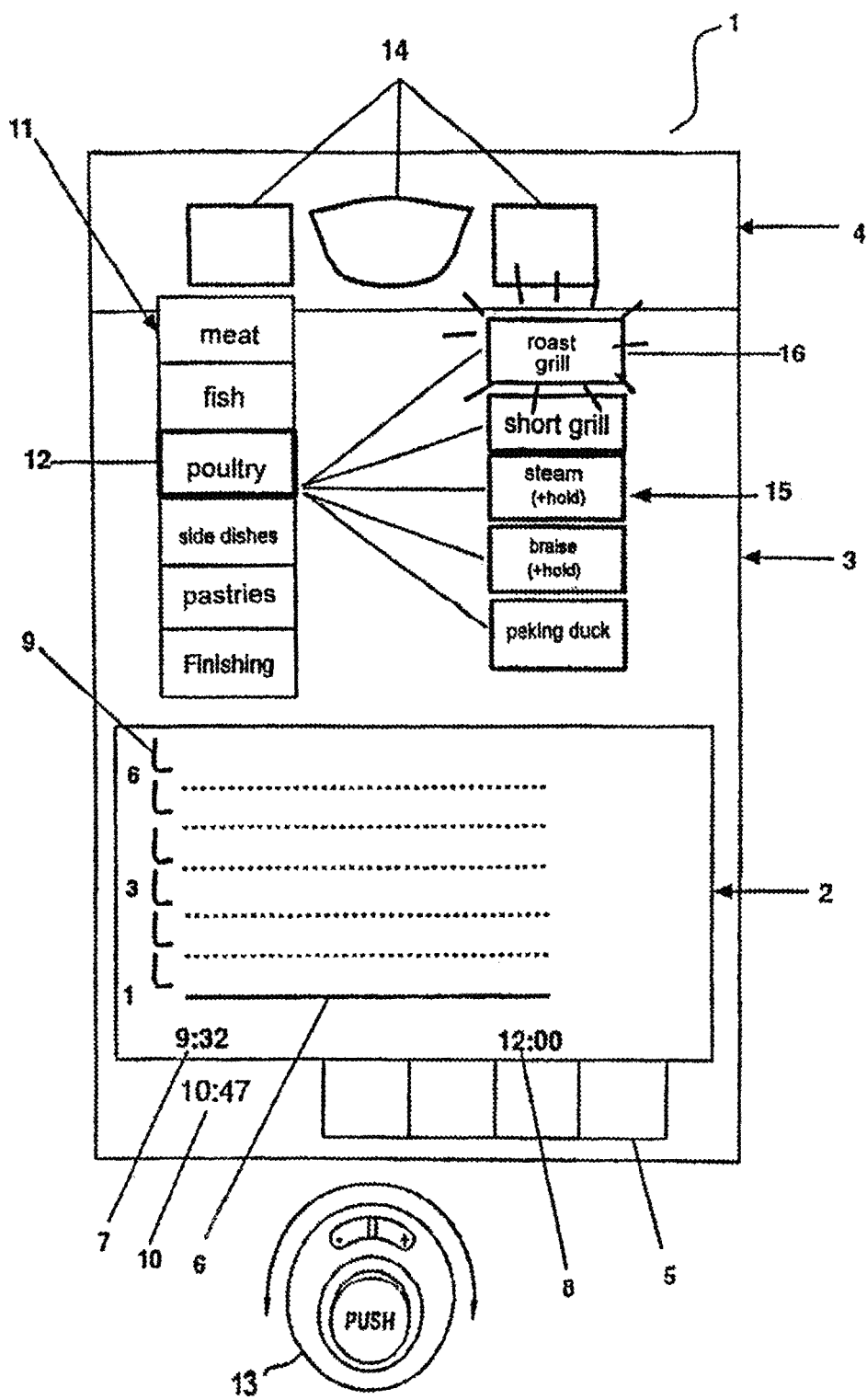
FIG. 2 shows the touch screen shown in FIG. 1, in which a first sub-operating menu has been opened.

After the user of the cooking device has selected "poultry", a first sub-operating menu, which is shown in FIG. 2 for this selected cooking mode is opened, with selection elements 15 for cooking processes such as "roast grill", "short grill", "steam (+hold)", "braise (+hold)" and "Peking duck".

As an alternative to the letters or code words shown in FIGS. 1 and 2 for identifying the selection elements 11, 15 for cooking modes and cooking processes, symbols and/or numbers can also be displayed. For example, illustrations of the respective items of food to be cooked can be shown. It is noted that a large number of cooking processes, not shown, can also be provided for a display. It can also be sufficient for the selection of a cooking program that only one cooking mode is selected such as "finishing", so that a selection of a cooking process becomes unnecessary and that therefore, no first sub-operating menu is opened.

The arrangement of the operating menu shown in FIG. 2 with the selection elements 11, 15 for cooking modes and cooking processes is only exemplary, and any required graphic arrangements of the selection elements are possible.

Figure 3:
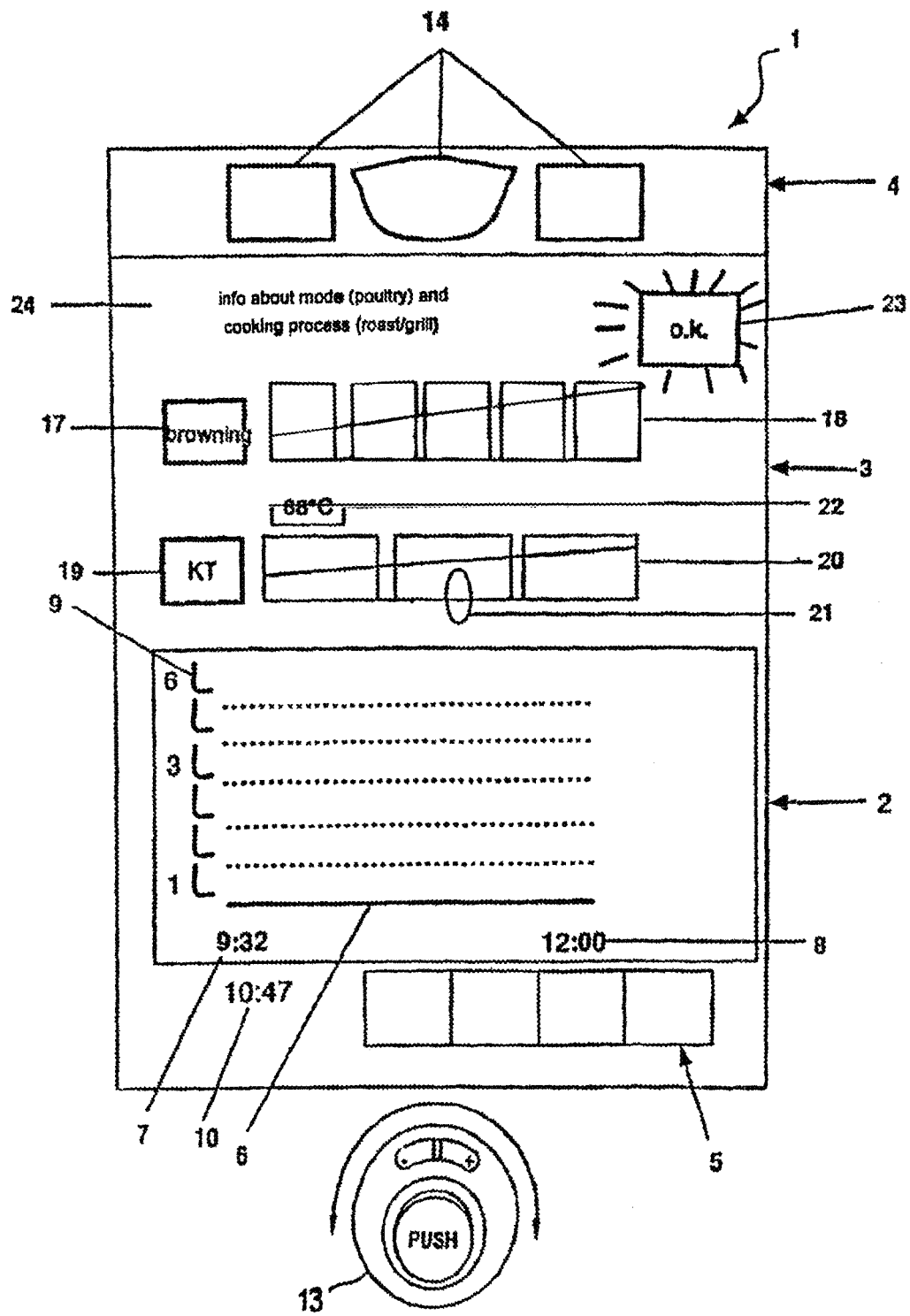
FIG. 3 shows the touch screen shown in FIG. 1, in which a second sub-operating menu has been opened.

If for example the user confirms by touching the selection element 16 "roast grill", this selected cooking process can be visually emphasized, such as by means of a flashing indicated in FIG. 2, and a second sub-operating menu item shown in FIG. 3 can be opened.

The second sub-menu item shown in FIG. 3 comprises further display elements 17, 18, 19, 20, 21 for selecting cooking parameters which are suitable for a poultry roast or grill, namely a browning display element 17, together with browning intensity display elements 18 and a core temperature display element 19 together with a core temperature level display element 20. The user can now touch one of the browning intensity display elements 20 and by means of a selection element 21 in the form of a slide regulator can set the required core temperature for an item of food to be cooked. Alongside the graphic depiction of the selected browning intensity and core temperature, the selected values can also be numerically displayed to the user, such as via a display element 22 for the selected core temperature. In a similar way as setting the core temperature level or the browning intensity, a user may also set a time of cooking. This can be done using a similar slide regulator and display, or numerical display.

After the user has set a required value for the core temperature, in FIG. 3, 88° C., by touching one of the display elements 18 of the browning intensity and moving the core temperature selection element 21, the user can complete these values by confirming, for example by touching a confirmation element 23 with a finger. It can also be provided that a confirmation of this type must not necessarily be made.

It can furthermore be provided that in the second display area 3, context-sensitive information 24 regarding the already selected mode "poultry" and/or the selected cooking process, i.e. "roast grill" is displayed, and it is clear to those skilled in the art that this is possible at all operating menu levels.

Figure 4:
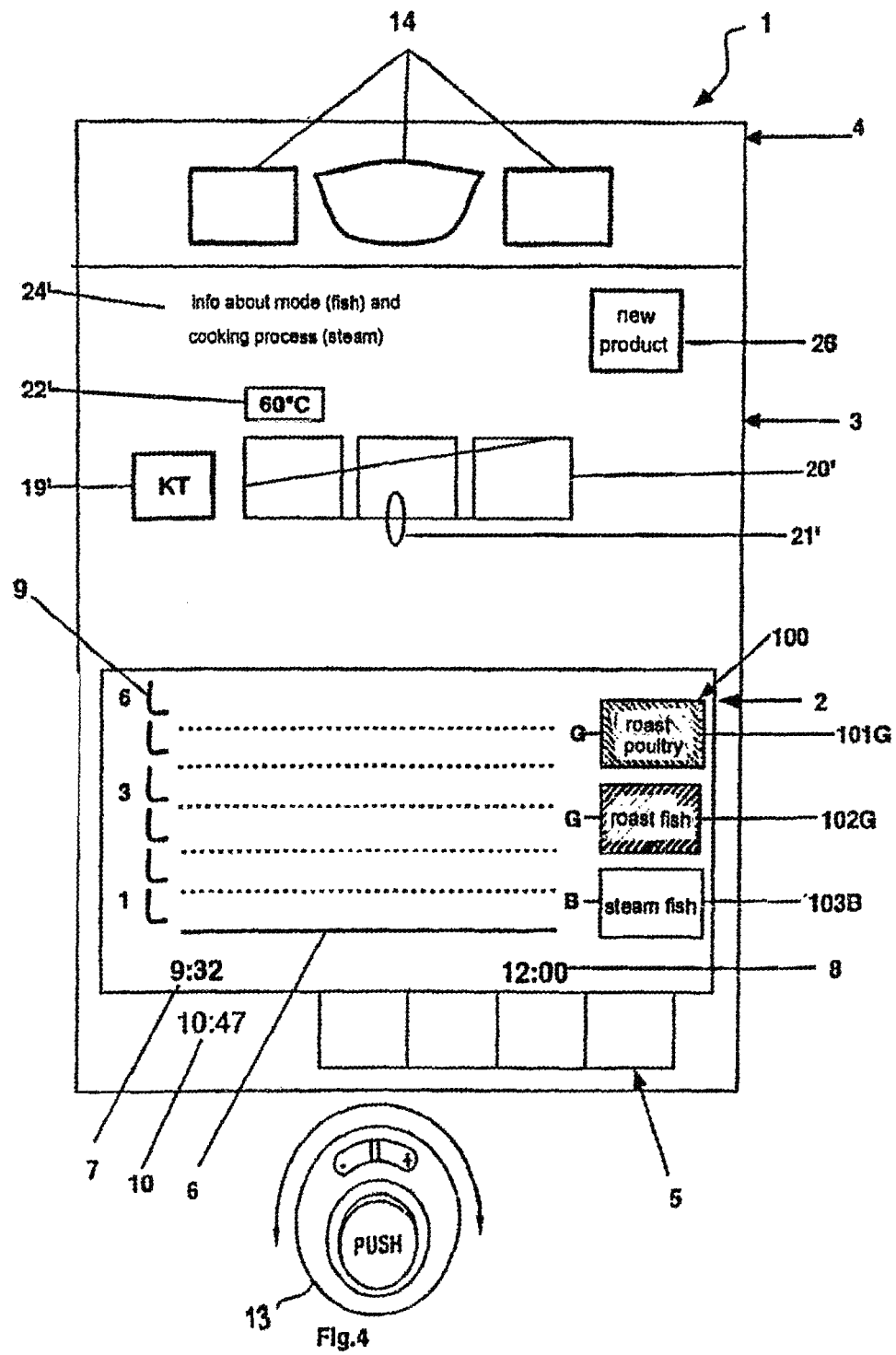
FIG. 4 shows the touch screen shown in FIG. 1, in which cooking programs are shown in a virtual token bar.

After the user has confirmed their current inputs via the confirmation element 23, the cooking program which has then been selected, i.e. which can be determined from the selected mode, the selected cooking process and the set cooking parameters and characterized with the codewords "roast poultry", can be assigned to a virtual token 101G in a virtual token bar 100. In FIG. 4, a virtual token bar 100 is shown with three virtual tokens 101G, 102G and 103G after three cooking programs have been selected, namely in addition to "roast poultry" (first cooking program), "roast fish" (second cooking program) and "steam fish" (third cooking program), after the cooking parameters of the third cooking program have been selected via selection elements 19', 20', 21 and with the display element 22' of the core temperature and the information 24'. Here, each cooking program is selected in a similar manner to the first cooking program which is described above in detail. A fourth cooking program could also be selected by touching a further selection element 26.

Here, FIG. 4 shows a fourth sub-operating menu in which the virtual token bar 100 which is shown in the first display area 2 covers all cooking programs which are confirmed by a user and which are shown as virtual tokens 101G, 102G and 103G. Alternatively, it is possible to also show virtual tokens in the virtual token bar before they are confirmed by the user, and to identify these in such a manner that they can be differentiated from confirmed virtual tokens, either graphically and/or by using symbols.

If a user touches one of the virtual tokens 101G, 102G, 103B with a finger, for example, the cooking parameters for the respective mode and the respective cooking process of the cooking program which relates to the touched token can be displayed in the second display area 3, and adapted according to the requirements of the user.

The virtual tokens which are automatically generated by the cooking device according to the invention can through their color and shape contain information as to the extent to which a cooking program can be completed jointly in a mixed load with one or more other cooking programs, as will be explained in greater detail below.

Figure 5:
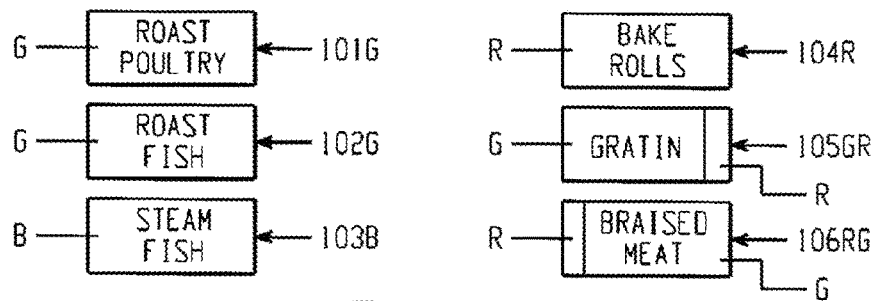
FIG. 5 shows virtual tokens for cooking programs with different colors.

As FIG. 5 shows, virtual tokens 101G, 102G, 103B can be identified using a color for each cooking area climate required for the cooking program which is related to the virtual token. For example, the virtual token "roast poultry" 101G' and the virtual token "roast fish" 102G can be made green (G) in order to identify a cooking climate in which both fish and poultry can be roasted. The virtual token "steam fish" 103b' is identified with the color blue (B), since a steaming process must be conducted separately, i.e. at a distance from or after a cooking area climate which is suitable for roasting. It is noted that the selection of colors is not restricted to the colors described, but any colors required can be used for differentiation purposes. In any case, a principle should be adhered to in which virtual tokens or virtual partial tokens of the same color identify cooking programs or cooking stages which can be conducted in the same cooking area, since they require the same climate parameters. Here, the temperature, humidity, flow speed, pressure and/or microwave energy can determine the climate parameters in a cooking area.

It can also be provided that a virtual token can be depicted in more than one color. It can be necessary for an item of food to be cooked to run through several cooking stages before it is fully cooked, and accordingly, the individual cooking stages of the related cooking program are identified in different colors. Thus, for example, a cooking area climate required for a "bake rolls" cooking program, which is represented by a red (R) token 104R is concordant with a required cooking area climate of a searing phase (=1st roasting stage) of a "braised meat" cooking program, with the dual-colored token 106RG, and with a crusting phase (=2nd cooking stage) required at the end of the "gratin" cooking program with the dual-colored token 105GR. In this exemplary embodiment, joint cooking of the areas of the virtual tokens 104R, 105GR, 106RG which are identified in red (R) is possible simultaneously due to the identical cooking area climate required. It is also feasible that items of food to be cooked which must be cooked over more than two cooking stages are also identified with a respective color for each cooking stage required.

Figure 6:
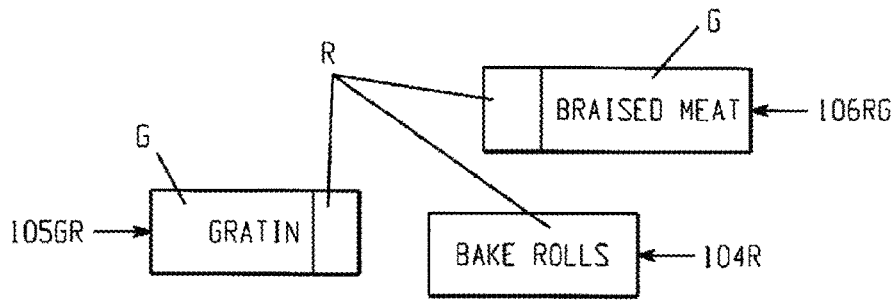
FIG. 6 shows an arrangement of virtual tokens for the cooking programs shown in FIG. 5 with reference to their color identification.

FIG. 6 shows a possible arrangement of the virtual tokens 104R, 105GR, 106RG in FIG. 5 in a token board on the basis of their color identification, by means of which the cooking stages with the same cooking area climate are depicted. As is made clear in FIG. 6, a depiction of virtual tokens 104R', 105GR', 106RG' (partial tokens) which are divided in color enables the user to make a simple compilation of the cooking stages with the same cooking area climate and as a result to efficiently prepare items of food which need to be cooked in different ways. It can anyway be noted that a plurality of different items of food to be cooked with identical or varying cooking stages can be shown in such a manner that they can be differentiated on the basis of their color.

Figure 7:
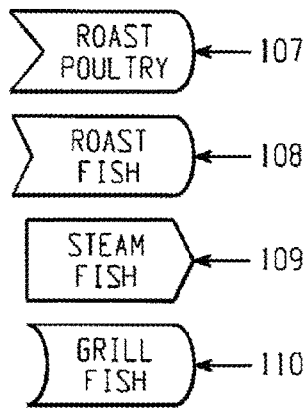
FIG. 7 shows virtual tokens for cooking programs with different geometric shapes.

FIG. 7 shows another possible graphic depiction of alternative virtual tokens "roast poultry" 107, "roast fish" 108, "steam fish" 109 and "grill fish" 110. Instead of a color identification as is described with reference to FIGS. 5 and 6, the virtual tokens in FIG. 7 are shown with differently shaped beginnings and/or ends. This geometric shape of the virtual tokens 107, 108, 109, 110 provides visual information on the one hand regarding cooking programs which can be cooked jointly, while on the other, providing information regarding the sequence in which different items of food to be cooked can best be cooked. When virtual tokens have the same geometry, this means that the corresponding items of food to be cooked can be cooked jointly. If geometries which complement each other on two edges are present, such as with the left-hand edge of the token 107 or 108 and the right-hand edge of the token 109, this means that the cooking programs of the token 109 and 107 or 108 can be conducted in succession, as will be described later with reference to FIG. 8.

It is also feasible that in addition to a specific geometric shape or geometry, virtual tokens can also have color identifications. A geometric differentiation of the virtual tokens can e.g. have the advantage that the geometry can show information to the user regarding the optimum sequence of loading of a cooking device according to the invention with items of food to be cooked. For example, it can be advantageous in terms of energy consumption when a sequence such as the one shown in FIG. 8 is maintained with a cold cooking device.

Figure 8:
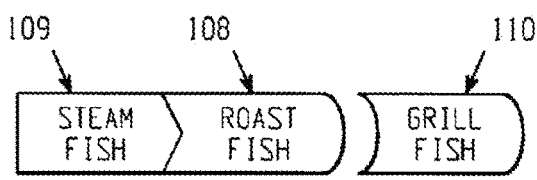
FIG. 8 shows a possible arrangement of virtual tokens for the cooking programs shown in FIG. 7 with reference to their geometric form.

In FIG. 8, the cooking program of the virtual token "steam fish" 109 is first implemented in the cooking device according to the invention, in order to then maintain a medium temperature level which results from the steaming when implementing the cooking program "roast fish" 108, and only then to implement the cooking program "grill fish" 110 at a high temperature level. This optimum sequence is displayed to the user by means of a key-lock symbol which is automatically displayed by the cooking device on the left-hand and/or right-hand edge of the virtual token 108, 109, 110. Furthermore, combinations consisting of a geometric shape at the start and/or at the end of a virtual token and a color identification can also be used. Furthermore, it is noted that any geometric shape can be used for identifying virtual tokens.

Figure 9:
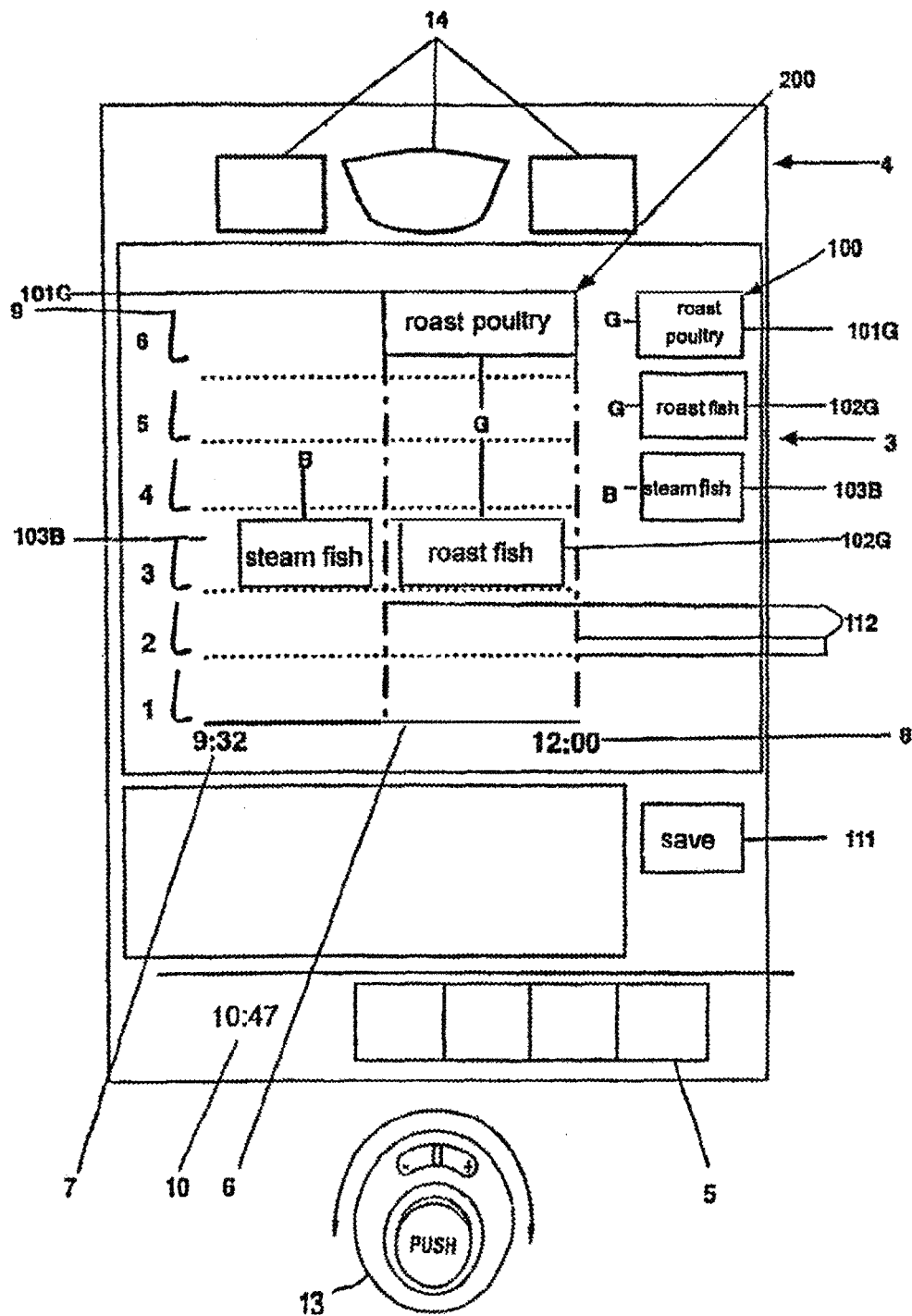
FIG. 9 shows the touch screen shown in FIG. 1 with a depiction of a first time and area arrangement of tokens in a virtual token board and a virtual token bar.

Before cooking items of food to be cooked in a cooking device according to the invention with a plurality of insertion levels, a time assignment and an area arrangement of the virtual tokens to the insertion levels 9 shown in FIG. 9 a time bar 6 are needed. An assignment of this type can be conducted both by the user and in the form of an automatic assignment by the cooking device according to the invention. It can for example automatically appear as the fifth sub-operating menu, starting from the fourth sub-operating menu shown in FIG. 4, after a specific period of time has elapsed, without a selection element being actuated.

As shown in FIG. 9, the virtual token bar 100 with the three virtual tokens "roast poultry" 101G, "roast fish" 102G, "steam fish" 103B, is located in the second display area 3 on the right-hand side next to a virtual token board 200 of the touch screen 1. The user has the option, due to the touch function of the touch screen, for example using "drag and drop" functions, to pull the cooking programs which are depicted as virtual tokens onto the insertion levels 9 at a required time point along the time bar 6 of the cooking device according to the invention. Here, the user can also take into account the additional information given by the color and/or geometry of the virtual tokens.

Within the time and area arrangement of the virtual tokens 101G, 102G, 103B, further functions can assist the user which will be described further below.

A "denied parking position" function prevents virtual tokens or virtual partial tokens of different colors and/or geometries, which accordingly require different cooking area climates, from being arranged below or above each other at the same point in time on the time bar 6, e.g. at different insertion levels 9. Thus, a time overlap which is at least of short duration of cooking programs or cooking stages which require different climate parameters, such as temperature, humidity, flow speed, pressure and/or microwave exposure, is avoided.

A further function which assists the user is given by the width of the respective tokens. As can be seen in FIG. 9, when the virtual tokens 101G, 102G, 103B are transferred from the virtual token bar 100 to the time bar 6, which is limited by a starting time point 7 of the cooking programs and an orientation time point 8, and thus into the token board 200, the width of the virtual tokens 101G, 102G, 103B changes along the time bar 6. While the virtual tokens 101G, 102G, 103B are still located in the virtual token bar 100, they have an identical width, and this is depicted in the token board 200 according to the ratio of the duration of the respective cooking programs. This therefore means that the width of a virtual token 101G, 102G, 103B also in fact symbolizes the total cooking time of the respective cooking program. The required cooking time of a respective cooking program can be determined by accessing empirically calculated values and/or can be determined using self-learning, i.e. by previous actions undertaken by the user.

Preferably, a third supporting function, "orientation lines" or "catch lines" is also available to the user. When positioning the virtual token 101G, 102G, 103B, the catch lines 112 in the virtual token board 200 serve to support a simple arrangement. The catch lines 112 are visible when the user pulls a virtual token 101G, 102G, 103B from the token bar 100 into the time bar 6, and/or when a virtual token 101G, 102G, 103B is moved within an insertion level 9 in time along the time bar 6, and/or when it is moved from a first insertion level to a second insertion level 9. This moving of a virtual token 101G, 102G, 103B can be completed using "drag and drop". The catch lines 112 create a connection between potential deposition times and insertion levels 9. If the user moves one of the virtual tokens 101G, 102G, 103B close to the catch lines 112 using "drag and drop", e.g. from a defined distance to one of the catch lines 112 when releasing the virtual token 101G, 102G, 103B, the point which lies closest to the catch lines 112 is automatically selected. It is noted that a plurality of horizontal and vertical catch lines can be displayed as an assistance to the user, wherein naturally, other geometric forms of catch lines are also possible. The catch lines can be activated or removed by the user as required.

Figure 10:
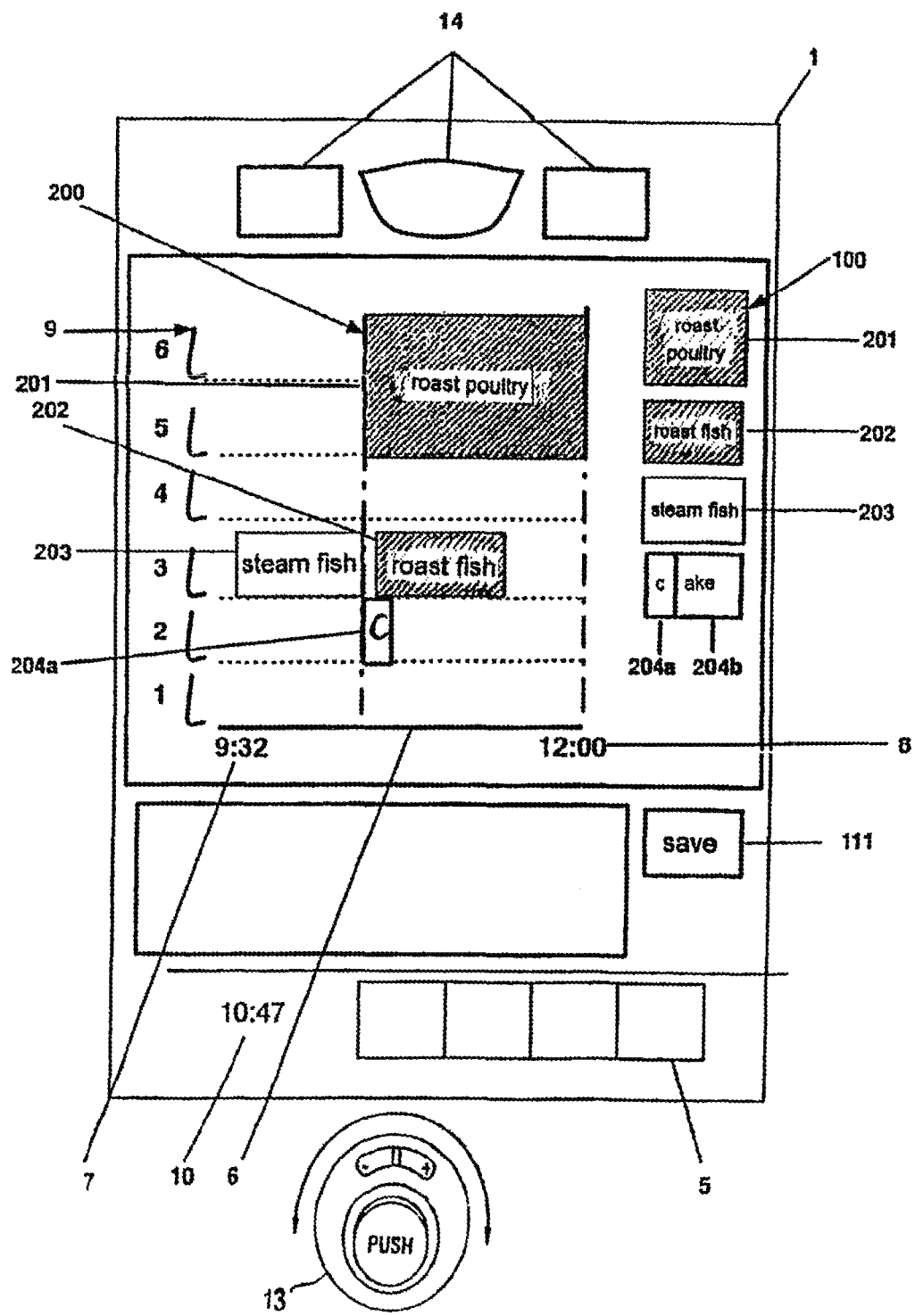
FIG. 10 shows the touch screen shown in FIG. 1 with a depiction of a second time and area arrangement of tokens in a virtual token board and a virtual token bar.

Further assistance to the user when creating a sequence plan for cooking items of food to be cooked is shown in FIG. 10 as an alternative to the fifth sub-operating menu shown in FIG. 9. In the virtual token bar 100 and in the virtual token board 200, virtual tokens "roast poultry" 201, "roast fish" 202, "steam fish" 203 and "cake" 204 are shown with different heights. The height shows an anticipated requirement with regard to insertion levels 9 in each case. The user is thus already informed via the different heights of the virtual tokens 201, 202, 203, 204 before depositing them on one of the insertion levels 9 as to what area requirement the respective cooking procedure entails. For example, a cooking program which is identified by the virtual token 201 "roast poultry" requires two insertion levels 9, since during a roast poultry program, supports for the food to be cooked, which are for example sold by the applicant under the commercial name of Superspike, are used.

Furthermore, for items of food to be cooked, such as cakes, a division of the related virtual tokens 204 into several partial tokens, such as a virtual partial token "cake base" 204a and the virtual partial token "cake finishing" 204b, can be provided. Certain items of food to be cooked run through several cooking stages until the cooking program reaches its end, between which even an interim treatment stage outside of the cooking device according to the invention must be completed. For the virtual token "cake" 204, it can for example be provided that first a base of the cake, such as that represented by the virtual partial token 204a, is cooked at high temperatures together with the cooking programs for virtual tokens 201, 203, while after an interim treatment stage outside of the cooking device, subsequent cooking which is identified by the virtual partial token 204b is conducted in a cooking area climate with a lower temperature, without this later time point being shown in FIG. 10.

It is noted that the height of the virtual token is oriented according to the area requirement of the corresponding cooking program, and does not have to be limited to two insertion levels 9. Furthermore, it is natural that if required, any division of virtual tokens into a necessary or required number of virtual tokens can be made possible.

Figure 11:
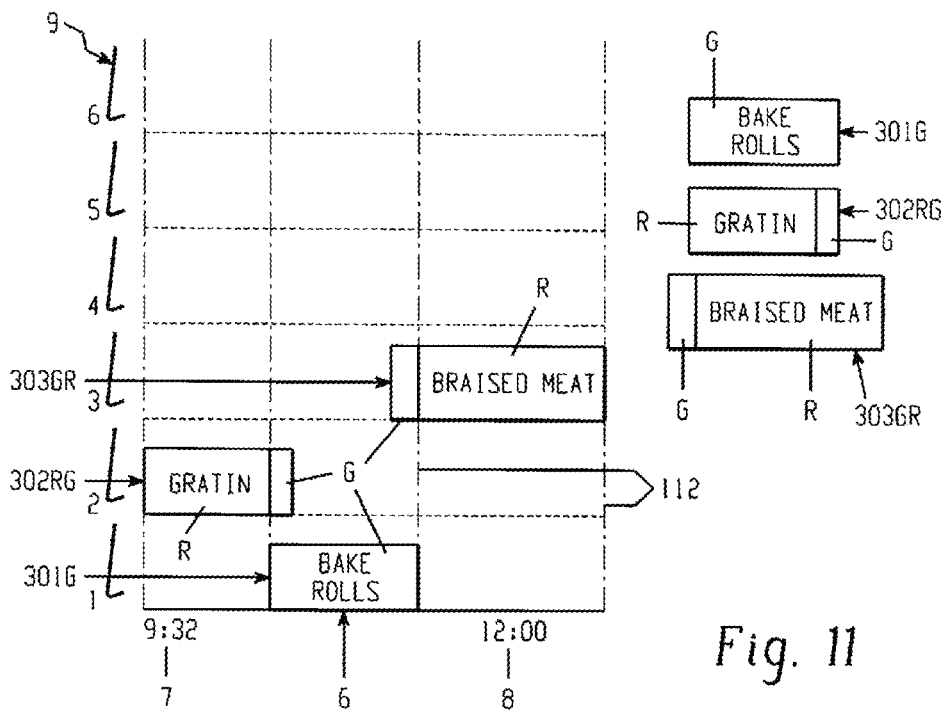
FIGS. 11 and 12 show virtual tokens for cooking programs with different time arrangements, but the same area arrangements.
Figure 12:
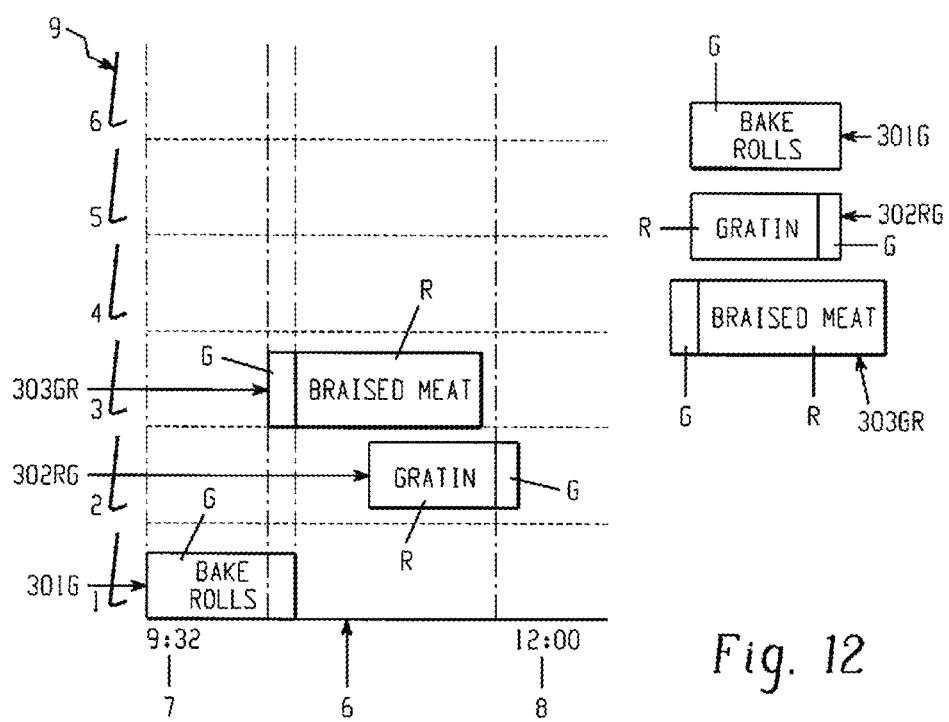

Automatic arrangements of virtual tokens in the virtual token board 200 are shown in FIGS. 11 and 12. Here, the virtual tokens "bake rolls" 301R, "gratin" 302RG, and "braised meat" 303GR, which are deposited on the virtual token bar 100, are deposited at corresponding time points on the time bar 6 which is limited by the start time point 7 and the orientation time point 8, 11, and/or on corresponding insertion levels 9.

An automatic assignment can automatically be conducted under different priorities, i.e. with different priority parameters, by a cooking device according to the invention. It can for example be provided that the virtual tokens 301R, 302RG, 303GR are optimally assigned according to energy consumption aspects, for example wherein first a steam cooking stage is completed, followed by a combined steam-cooking stage, and then a hot air cooking stage. This arrangement can also be displayed to the user using geometric shapes of the virtual tokens 301R, 302RG, 303GR, such as that used for the virtual tokens 107, 108, 109, 110 in FIG. 7. Alternatively, it is feasible that an optimal arrangement of the virtual tokens 301R, 302RG, 303GR can be made in order to achieve the shortest possible utilization of the device, with subsequent reduction of resources required, such as working time needed. In general, an optimization of the arrangement is also possible with under other parameters in the cooking device according to the invention, and is clearly not limited to the examples given here.

An exemplary arrangement of the virtual tokens 301R, 302RG, 303GR is shown in FIG. 11. If the user is dissatisfied with the recommended automatic arrangement of the virtual tokens 301R, 302RG, 303GR, then a re-prioritization can for example be conducted by the user which can lead to a re-arrangement of the virtual tokens 301R, 302RG, 303GR such as that shown in FIG. 12. If the user requires, for example, that the cooking program related to the virtual token "bake rolls" 301R should already be successfully completed at an earlier time point, they can pull this token using "drag and drop", for example, from the time point shown in FIG. 11 on the time bar 6 to an earlier time point. After the user has completed the re-prioritization, it is feasible that an automatic re-arrangement of the time points and the respective insertion levels of the remaining virtual tokens 302RG, 303GR is automatically conducted by the cooking device in adherence to the framework conditions selected by the user. It is noted that any number of re-prioritizations required can be initiated by the user, with a corresponding automatic adaptation by the cooking device according to the invention of the time sequence and/or the area arrangement of the cooking programs according to the selected virtual tokens (not shown).

Furthermore, it is feasible that a user is shown a critical path (not shown) which comprises the virtual tokens, which must of necessity be loaded or unloaded at certain time points in order to maintain the required sequence plan.

It can also be provided that a user can set as required the time period shown on the time bar 6, for example by specifying a display time period via a starting time point 7 or along an orientation time point 8, or that a time period shown can be moved along the time axis. According to the time period required, the size of virtual tokens (not shown) can automatically be adapted to the display of a sequence plan by the cooking device according to the invention. A selection of a required time period is not limited to the possibilities described; it is equally feasible to enable the user to specify a display time period via a counter-control, or using other suitable means.

It is also possible to display the depiction in the area of the virtual token board 200 not only two-dimensionally, but also three or even four-dimensionally. Three dimensions would give two site coordinates (position axes) and one time coordinate (time axis), while a four-dimensional depiction would enable a depiction of the three-dimensional area over time. Site coordinates can be used to precisely specify treatment zones within a cooking area, e.g. via a number of an insertion level and the arrangement of a treatment zone within an insertion level. Since each user has different preferences, it is here possible to allow the user to select how many dimensions that token board 200 should comprise, and which dimensions can be deposited. With the token boards 200 described above, only one site coordinate, namely for the number of an insertion level 9 and one time coordinate, namely in the form of a time bar 6, has in each case been selected, in order to keep the depictions simple. The selected depictions should therefore not be regarded as a limitation; rather, a large number of variation options are provided for a method according to the invention, in order to provide users with different needs the depiction which they require.

Further flexibility with regard to the depiction is made possible when a user cannot only select the dimension of the depiction, but also initiate a reduction in size, enlargement or displacement of the display area. It is also possible to enable area depictions to move over time, or similar.

Furthermore, at least one progress bar can be displayed (not shown), which depicts the progress of at least one cooking program over time. Each cooking program, and thus each virtual token in the virtual token board can also be assigned one progress bar respectively. Here, it is particularly advantageous when a user can select whether and if appropriate, how many, progress bars should be shown. It is noted that in order to display the progress bars, each graphic depiction suitable for the purpose can be used, and that this graphic depiction can be placed on, adjacent to or close to the respective virtual token, insofar as an assignment of the progress bars to the virtual tokens can be clearly seen. Here, it is of no importance whether the assignment is made with virtual tokens on the virtual token board, or along the time bar. Alternatively, or in addition to a depiction of one or more progress bars, a numerical depiction of a residual cooking time can also be given. Furthermore, any arrangement required of the total progress bar is also possible, as is a numerical depiction of a total residual cooking time.

Figure 13:
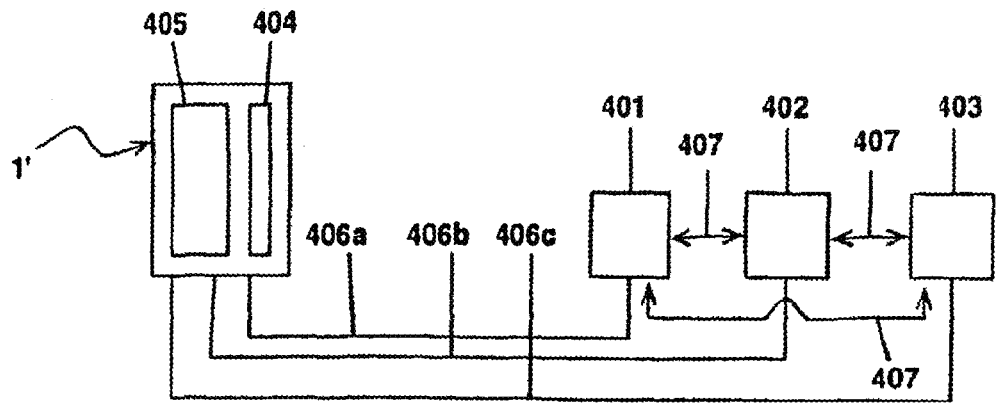
FIG. 13 shows a system of networked cooking devices with a shared input and display device.

An input and display device shown in FIG. 13 in the form of a touch screen 1' which is separated from a cooking device, e.g. arranged in a service station, can also be used for the central control of one or more cooking devices 401, 402, 403. A virtual token bar 404 and a virtual token board 405 for this purpose are located on the touch screen 1', as an option for all cooking devices 401, 402, 403 which are connected to the touch screen 1', or for only one of these cooking devices 401, 402, 403 respectively. A connection of the cooking devices 401, 402, 403 with each other or with the touch screen 1' can here be achieved by means of a network cable 406a, 406b, 406c. Alternatively, it can be provided that the touch screen communicates via wireless LAN with the plurality of cooking devices 401, 402, 403. It can also be provided that the cooking devices 401, 402, 403 are connected to each other via a bus system 407, and in each case, an input and display device according to the invention in the form of a touch screen is present on each of the cooking devices 401, 402, 403, in order to enable a distribution of virtual tokens onto each cooking device 401, 402, 403 of the plurality of cooking devices.

Figure 14:
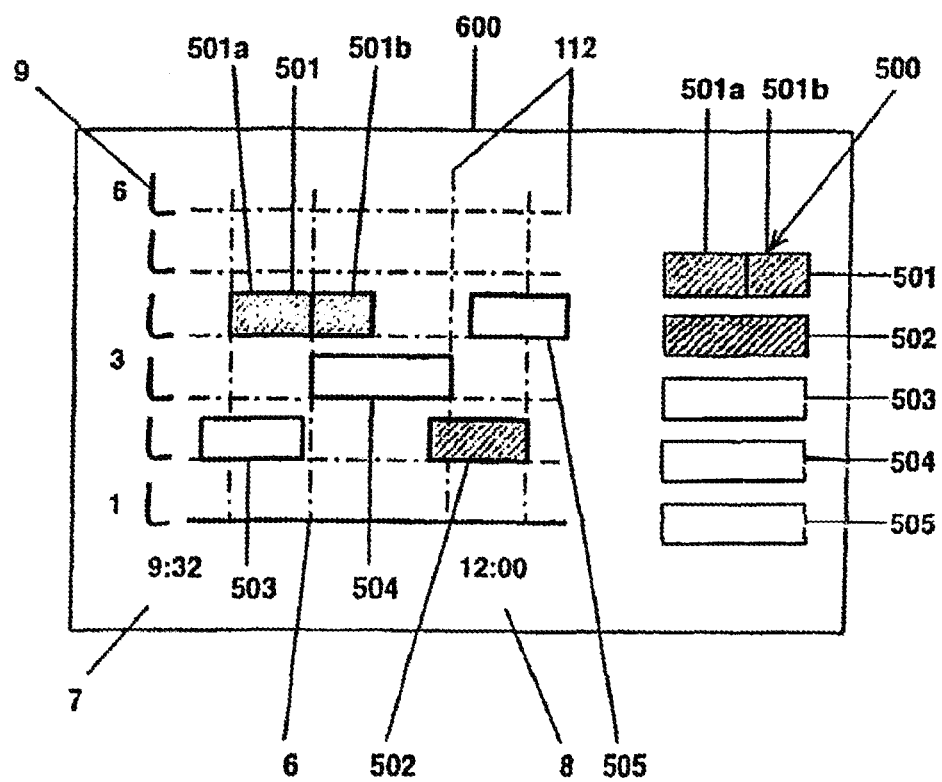
FIG. 14 shows an automatically optimized sequence plan with time-specific virtual tokens.

FIG. 14 shows virtual tokens 501, 502 in a virtual token bar 500, which must be cooked at a fixed time, while for other virtual tokens 503, 504 and 505, no time specifications have been made by the user. These different time specifications are visually identified by cross-hatch or no cross-hatch. Any manual displacements in the time sequence of the cooking programs relating to the virtual tokens 503, 504, 505 have no influence on the cooking time point of the cooking programs according to the virtual tokens 501, 502. For example, it can be provided that a cooking program which is divided into two cooking stages and thus two partial tokens 501a', 501b' must be fully cooked at a specific time prior to a lunchtime buffet, while a cooking program relating to the virtual token 502 must be fully cooked punctually for a possible opening at 12.08 pm. Therefore, only tokens 501 and 502 must be deposited at specific positions relative to the time bar 6 in the virtual token board 600, while all the other virtual tokens 502, 504, 505 which are deposited on the virtual token board 600 can be optimally arranged around the virtual tokens 501, 502 according to parameters required by the user.

It is noted that any number of virtual tokens required can be assigned a fixed implementation time, wherein this enables either a fixed starting time 7 or a fixed end time 8 of the cooking program, e.g. for rolling loading or removal. Furthermore, it is noted that the functions described for assisting the user can be combined when creating a sequence plan which entails specifying a fixed implementation time for certain virtual tokens 501, 502.

Figure 15:
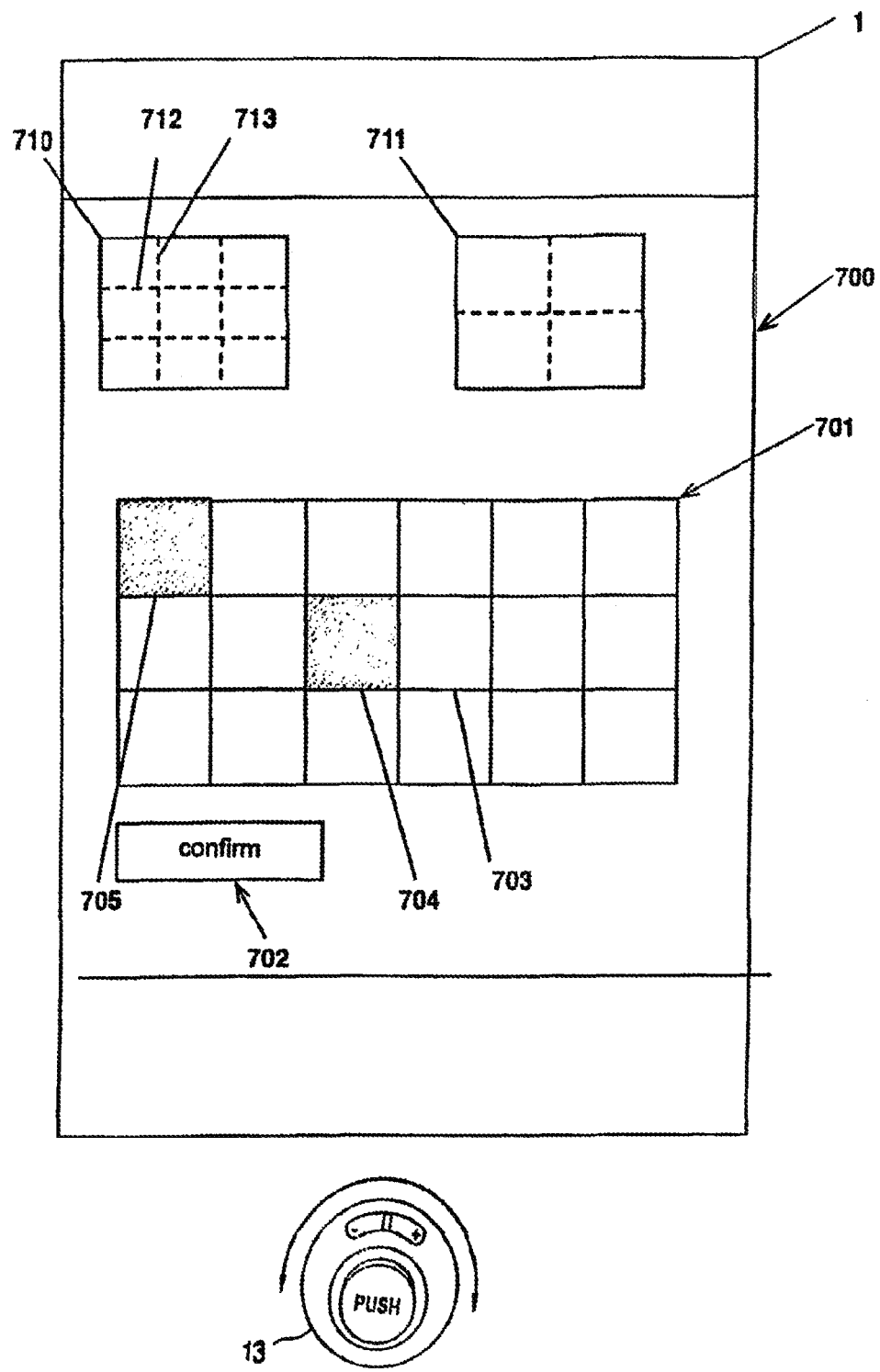
FIG. 15 shows a touch screen for depicting treatment zones at insertion levels for a time assignment of virtual tokens.

For an area arrangement of virtual tokens, a fourth display area 700 with virtual treatment zones 701 can also be displayed, as is shown in FIG. 15. After virtual tokens have been deposited on an insertion level 9 which is shown as an example in FIG. 9, the virtual treatment zones 701 can be displayed, either at the request of the user or automatically. Here, treatment zones 703 which have not yet been allocated and treatment zones 704, 705 which have already been allocated are identified differently in such a manner, e.g. by a different color and/or a clear cross-hatch in each case, that the user can see in which treatment zones 703, 704, 705 the virtual tokens which have not yet been assigned in terms of area can be deposited. Here, it can be provided that a number of treatment zones required for virtual tokens is already shown to the user before depositing on the virtual treatment zones 701. This can be achieved for example on the basis of virtual tokens 710, 711 shown by the fact that a required number of treatment zones in each case, e.g. 9 with the virtual token 710 or 4 treatment zones with the virtual token 711, is made clear using horizontal and vertical lines. Alternatively, it can also be possible to display a required number numerically either close to, alongside and/or on a virtual token.

It is noted that when the virtual tokens 710, 711 are deposited onto the virtual treatment zones 701, further functions can support a user when depositing. For example, an automatic blocking function can be provided which automatically prevents a depositing of a virtual token 710, 711 onto treatment zones 704, 705 which are at least partially allocated. Naturally, an automatic assignment can also be made, taking into account treatment zones which are still available. If required virtual tokens are assigned to corresponding virtual treatment zones, it can be provided that a user finally confirms the selection made using a confirmation element 702.

Additionally, it is noted that a plurality of free treatment zones corresponding to the virtual treatment zones 701 depicted can also be displayed simultaneously for several insertion levels of a cooking device and/or a plurality of cooking devices. Naturally, a plurality of virtual tokens can also be depicted with any number of virtual treatment zones required.

Figure 16:
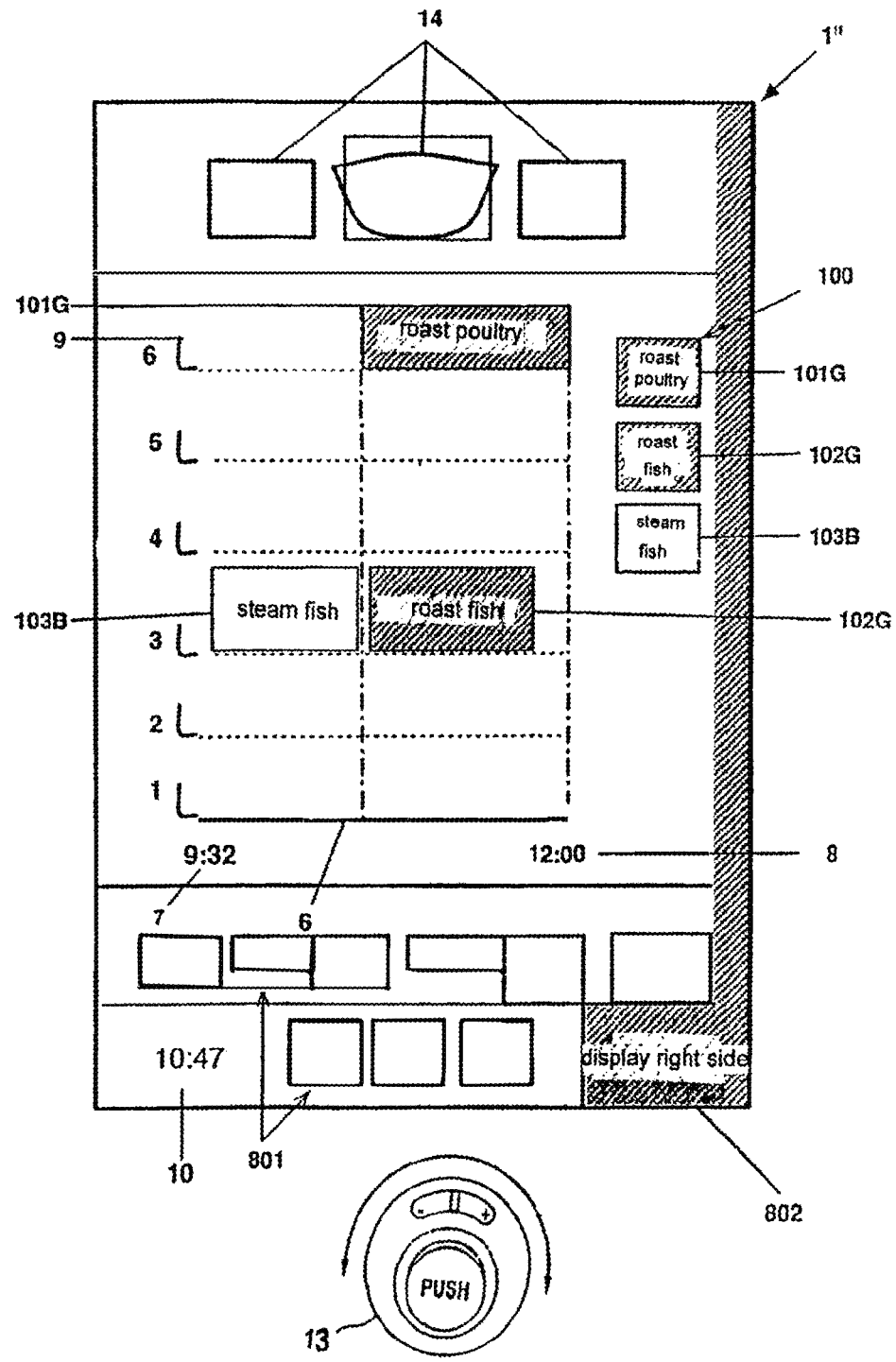
FIGS. 16, 17, and 18 show the touch screen shown in FIG. 1 with a depiction of display alteration areas between levels and/or pans of a cooking device and/or of cooking devices.
Figure 17:
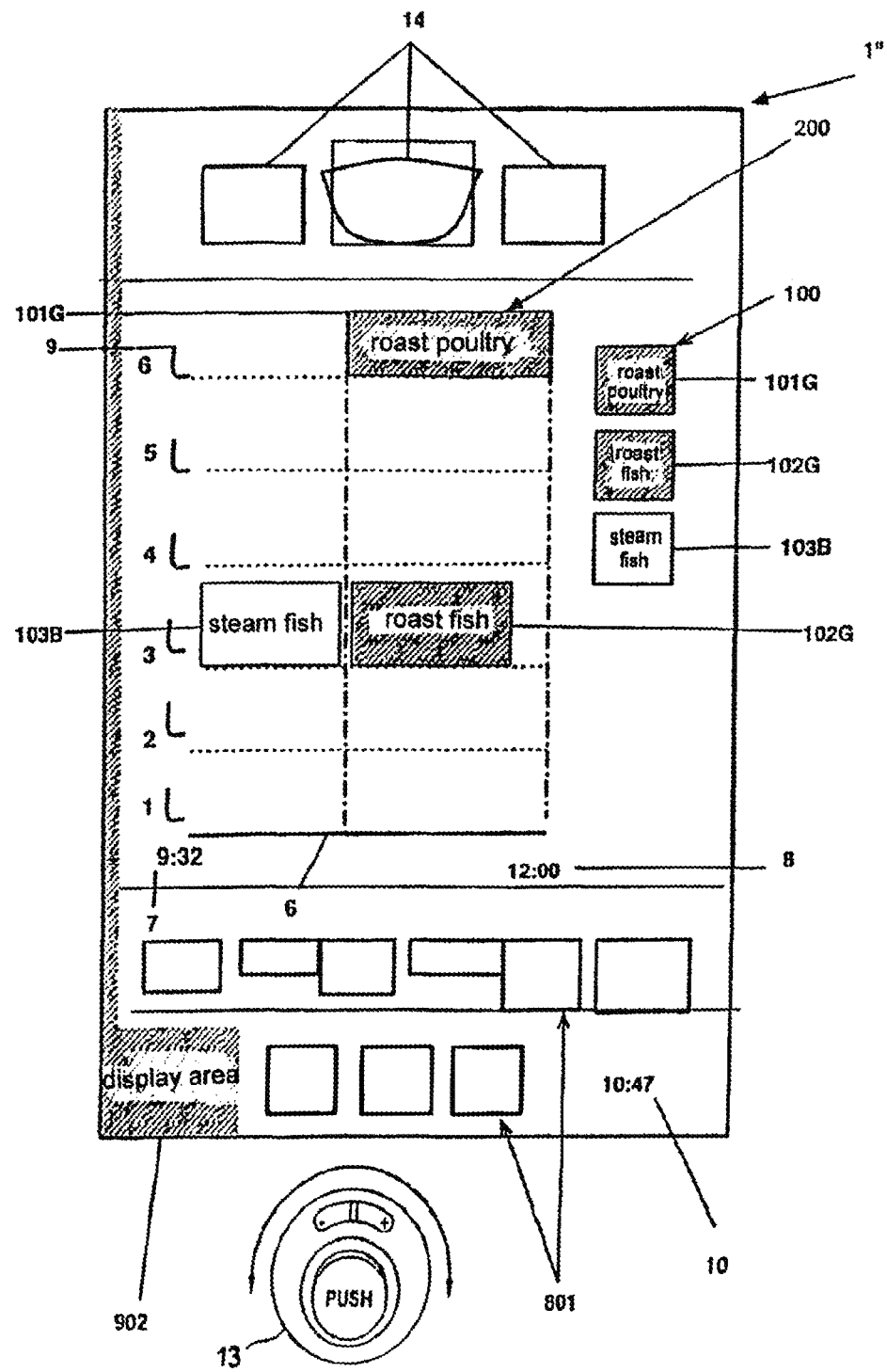

An option for changing displays between treatment areas, such as in the form of two pans and/or two levels of a cooking device, is shown in FIGS. 16 and 17. A required display change can here be achieved in such a manner that a display alteration area 802, 902 is shown on a touch screen 1", which can also be designed as a display area which is smaller, identified in a different color, with a different shape, cross-hatched, positioned and/or with different brightness of a further pan and/or a further level. FIGS. 16 and 17 differ only in terms of the arrangement of the respective display alteration area 802, 902, namely on the lower right-hand side in FIG. 16 and the lower left-hand side in FIG. 17. A moving of a virtual token bar 100, a virtual token board 200 and/or at least one of the virtual tokens 101G, 102G, 103B, for example using "drag and drop" onto the display alteration area 802, 902 can lead to a display for the further pan and/or the further level. Here, it can be provided that the virtual token bar 100 and/or the virtual token board 200 lead to a displacement of the token bar 100 and/or the token board 200 by touching and moving them onto the display alteration area 802, 902.

Alternatively, it is noted that a single virtual token 101G, 102G, 103B can accordingly be moved from the virtual token bar 100 and/or the virtual token board 200 onto a virtual token bar not shown and/or onto a virtual token board not shown. Here, it is also feasible that after moving a virtual token board 200, a virtual token bar 100 and/or a virtual token 101G, 102G, 103B onto the display alteration area 802, 902, no direct depositing by releasing occurs, but that it can also be provided that holding fast leads to an alteration in the display of the touch screen 1″, so that for example the virtual tokens 101G, 102G, 103B can be deposited directly onto a required insertion level and/or at a required time point on a further virtual token board not shown and/or a virtual token bar, and that after depositing, an automatic change back to the previous display can be provided.

Figure 18:
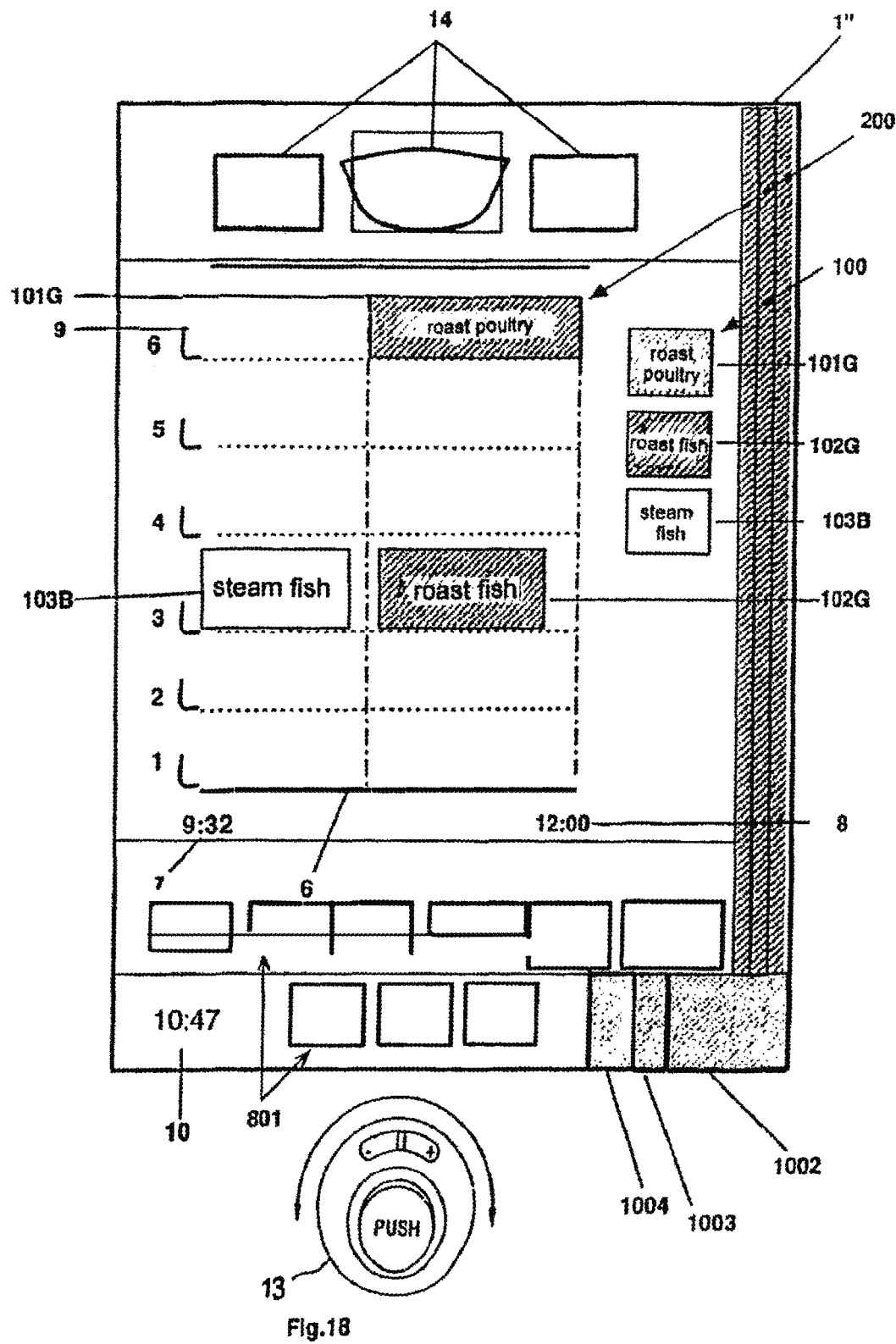

An alteration between different display areas which are representative for treatment areas, treatment zones, pans and/or cooking devices, is not restricted to the two display alteration areas 802, 902 described. To a far greater extent, as is shown in FIG. 18, it can also be provided that a display alteration between more than two display areas of a cooking device and/or a display alteration between a plurality of cooking devices which are networked with each other requires a large number of display alteration areas 1002, 1003, 1004. Thus, alongside a display alteration area 1002, for example for a display alteration between levels of a cooking device, one display alteration area 1003, 1004 respectively is provided for two further cooking devices. Here, it is noted that any number of display alteration areas required can be shown. It can also be provided that each display alteration area is assigned clearly to a specific cooking device and/or a specific level by means of a color identification, cross-hatch, a geometric shape or similar, wherein for example each cooking device can be assigned a clear color and display areas can be differentiated by cross-hatch and/or a geometric feature.

FIGS. 19-22 describe an example of providing different visual characteristics on a virtual token board to assist a user in arranging a new token on the token board. Throughout these examples, the visual characteristic which assists a user in arranging the new token on the token board is described as a color. However, a number of visual characteristics are covered by this disclosure including, but not limited to, a color, a color intensity, a transparency, a texture, a hatching, a pattern, a geometric shape, an outline shape, an outline color, an outline pattern, an outline hatching, among others According to this example, a user wanting to implement one or more different cooking programs represented by different virtual tokens in one cooking appliance may need assistance for correctly arranging the different virtual tokens on a virtual token board. As with the virtual token board 2 described above in reference with FIG. 1, the token board 2 of this example includes a time bar 6 or a time axis extending horizontally (x-axis) for time-based planning, and a space bar extending vertically (y-axis) for loading or insertion levels 9. As the positioning of the virtual tokens depends on compatibility of the cooking programs, a user may need assistance for correctly organizing the one or more cooking programs.

As mentioned above, for simplicity, the visual characteristic described throughout the example is color but is not limited thereto. Further, the color(s) described in this example include red, yellow, and green but it should be appreciated by one of ordinary skill in the art that the color(s) can be interchanged with other colors or with one another so that a variety of colors can be used. Three colors are provided for this example but other examples include only one color, or two or more different colors. For example, only two areas may be marked in different colors while the third area is kept neutral.

The three different colors of this example may correspond to three different circumstances in response to a user placing/moving virtual tokens on, near, or over the region of the virtual token board. The colors may cover different regions of the virtual token board to assist the user, as follows:

Red region(s): one or more virtual tokens are already active within a time window such that they cannot be moved anymore. For example, such active tokens may correspond to one or more food items which are already placed in the cooking device. In response to the customer desiring to place an additional virtual token that is incompatible with the active virtual tokens or that does not fit so that no combination is possible, a red region is provided.

Yellow region(s): one or more virtual tokens have already been placed on the virtual token board. The user would like to place a new virtual token that does not fit with or is incompatible with at least one of the virtual tokens already on the virtual token board. The new token can be placed on the virtual token board, but requires shifting of the one or more virtual tokens already on the virtual token board. In this example, the regions where the new token board may be placed but would require shifting of tokens already on the board are highlighted in a yellow color. Once the new token is placed on, near or over the yellow regions, the virtual tokens already on the board which would be affected by repositioning may include arrows indicating how they will be repositioned.

Green region(s) or drop zones: virtual tokens have already been placed on the virtual token board and the customer would like to place a new virtual token that is compatible with all of the virtual tokens already on the virtual token board. The combination of the virtual tokens would take place without any shifting because everything is compatible and can be combined. In this example, such regions on the virtual token board which are capable of receiving a new virtual token that is both compatible and would require no shifting to other tokens may be highlighted in a green color. These regions may also be referred to as drop zones.

In this example and throughout the specification, a token that is "incompatible" with at least one of the virtual tokens already on the virtual token board may refer to a token corresponding to a food item that cannot be combined in the cooking chamber with the food item corresponding to the virtual token already on the virtual token board because the temperature conditions do not allow the items to be combined together in the cooking chamber. The term "incompatible" may also refer to the absence of an open or available core temperature level; in other words, the level is occupied by another, simultaneously running product.

Figure 19:
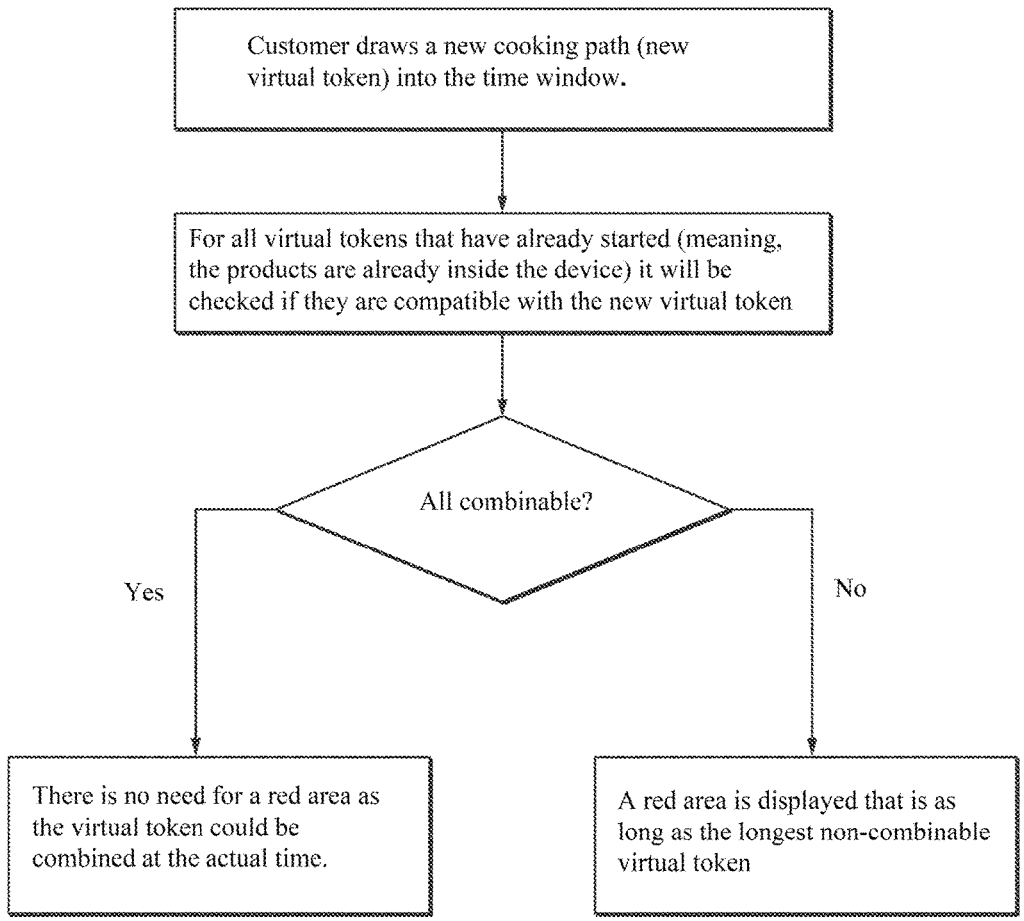
FIG. 19 is a diagram illustrating a process flowchart for depicting a red zone on a virtual token board such as the virtual token board of FIG. 1.

FIG. 19 is a diagram illustrating a process flowchart for depicting a red zone on a virtual token board.

Referring to FIG. 19, in a first step, a user may drag a new virtual token towards the virtual token board and into or overlapping with the virtual token board. Subsequently, all programs corresponding to virtual tokens already on the virtual token board and which have already started when the user is trying to add the new virtual token, will be checked for compatibility with the cooking program of the new virtual token. For example, if the new virtual token corresponds to cooking a steak in a certain manner and there are virtual tokens already on the board and already started corresponding to roasting fish, roasting poultry, etc . . . , each of the programs of roasting fish, roasting poultry, etc. . . . will be checked for compatibility with the new proposed program of cooking a steak of the new virtual token. If all such programs already on the board and already started are compatible/combinable with the program of the new virtual token, no red area will be displayed. However, if one or more of the programs already on the board and already started are incompatible or not combinable, a red zone is displayed which is as long as the longest virtual token corresponding to an incompatible cooking program.

Figure 20:
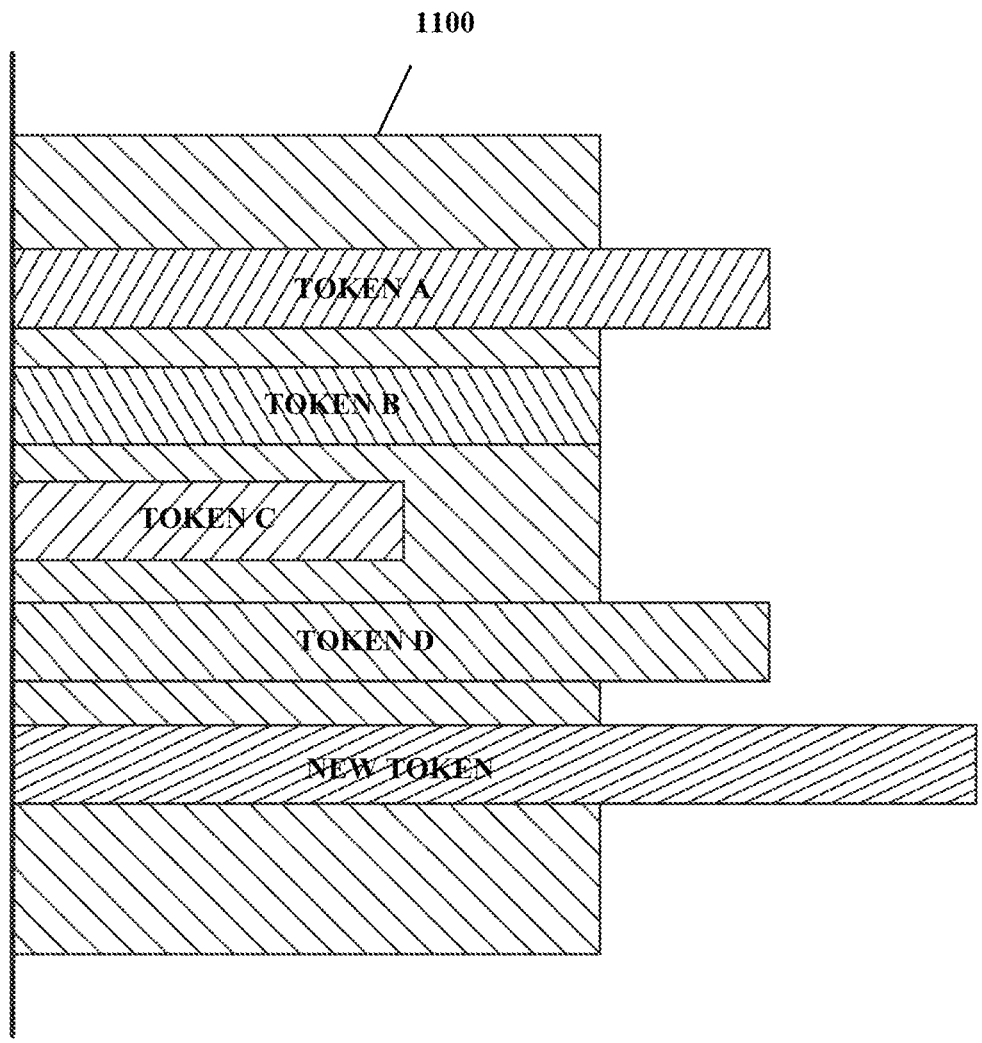
FIG. 20 is a diagram illustrating the virtual token board depicting the red zone according to the process flowchart of FIG. 19.

FIG. 20 is a diagram illustrating the virtual token board depicting the red zone according to the process flowchart of FIG. 19.

Referring to FIG. 20, a virtual token board already includes four tokens on the board corresponding to cooking programs. The four tokens are Token A, Token B, Token C, and Token D. A user may propose adding a new token, labeled "New Token", to the virtual token board. At that time, Tokens A, B, C, and D are checked for compatibility. In this example, Tokens A and D were compatible and Tokens C and B were incompatible with New Token. As a result, a red region 1100 is displayed, the red region 1100 being as long as the longest incompatible token already on the board which, in this case, is Token B.

Figure 21:
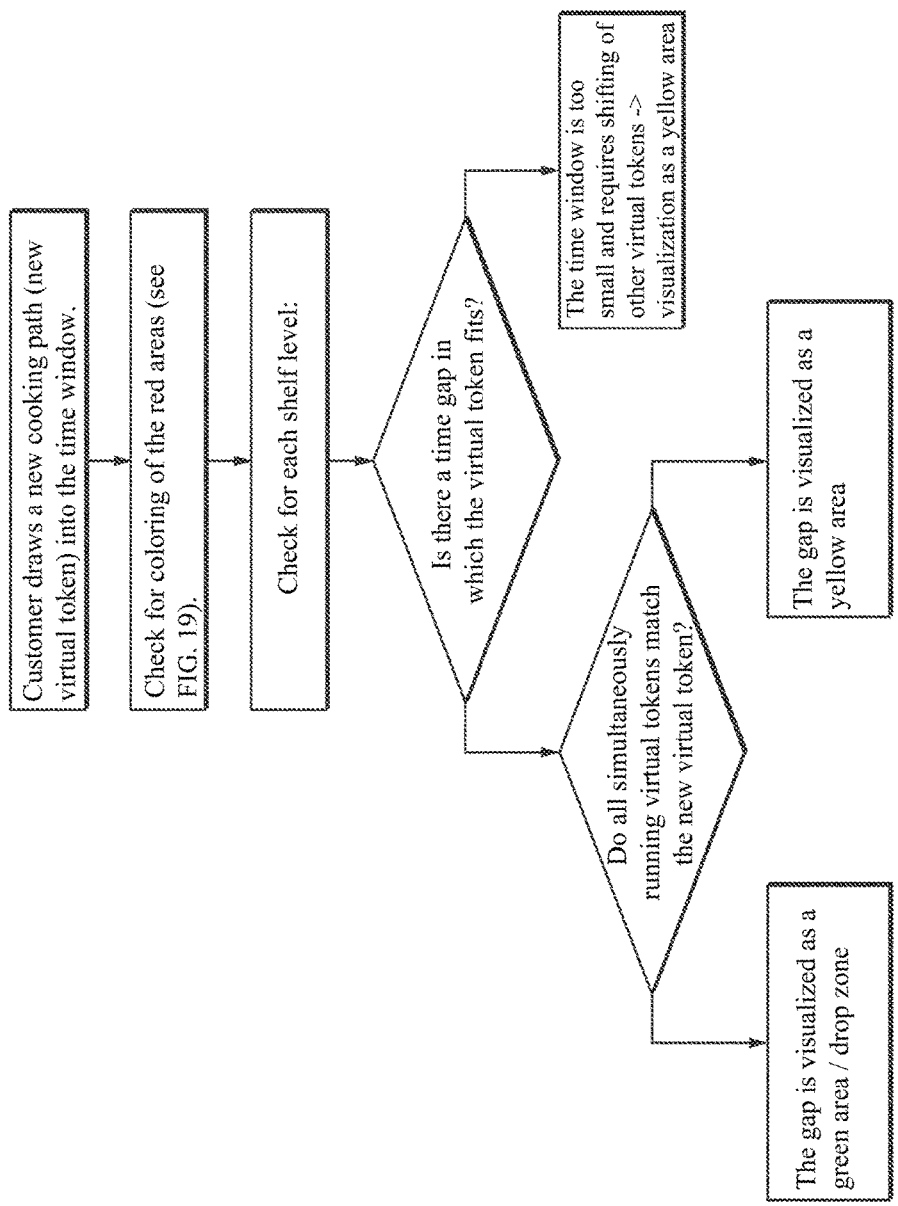
FIG. 21 is a diagram illustrating a process flowchart for depicting one or more red zones, yellow zones, or green zones on a virtual token board such as the virtual token board of FIG. 1.

FIG. 21 is a diagram illustrating a process flowchart for depicting one or more red zones, yellow zones, or green zones on a virtual token board such as the virtual token board of FIG. 1.

Referring to FIG. 21, in a first step, a user may drag a new virtual token towards the virtual token board and into or overlapping with the virtual token board. Subsequently, the process of displaying red zones as described above in reference with FIG. 19 may be followed. Then each of the shelf levels or positions may be checked for whether there is a time a gap in which the new virtual token would fit. If a time gap is too small, this time gap is highlighted as a yellow region. If a time gap would fit, then all cooking programs corresponding to virtual tokens which run simultaneously during this time gap in other cooking levels are checked for compatibility with the cooking program of the new virtual token. If all are compatible, the time gap is highlighted in a green color, but if one or more of the simultaneously running virtual tokens is incompatible, the time gap is highlighted in a yellow color. In an example, a processor may determine which regions are red and green, and then highlight all remaining regions as yellow by a process of elimination.

Figure 22:
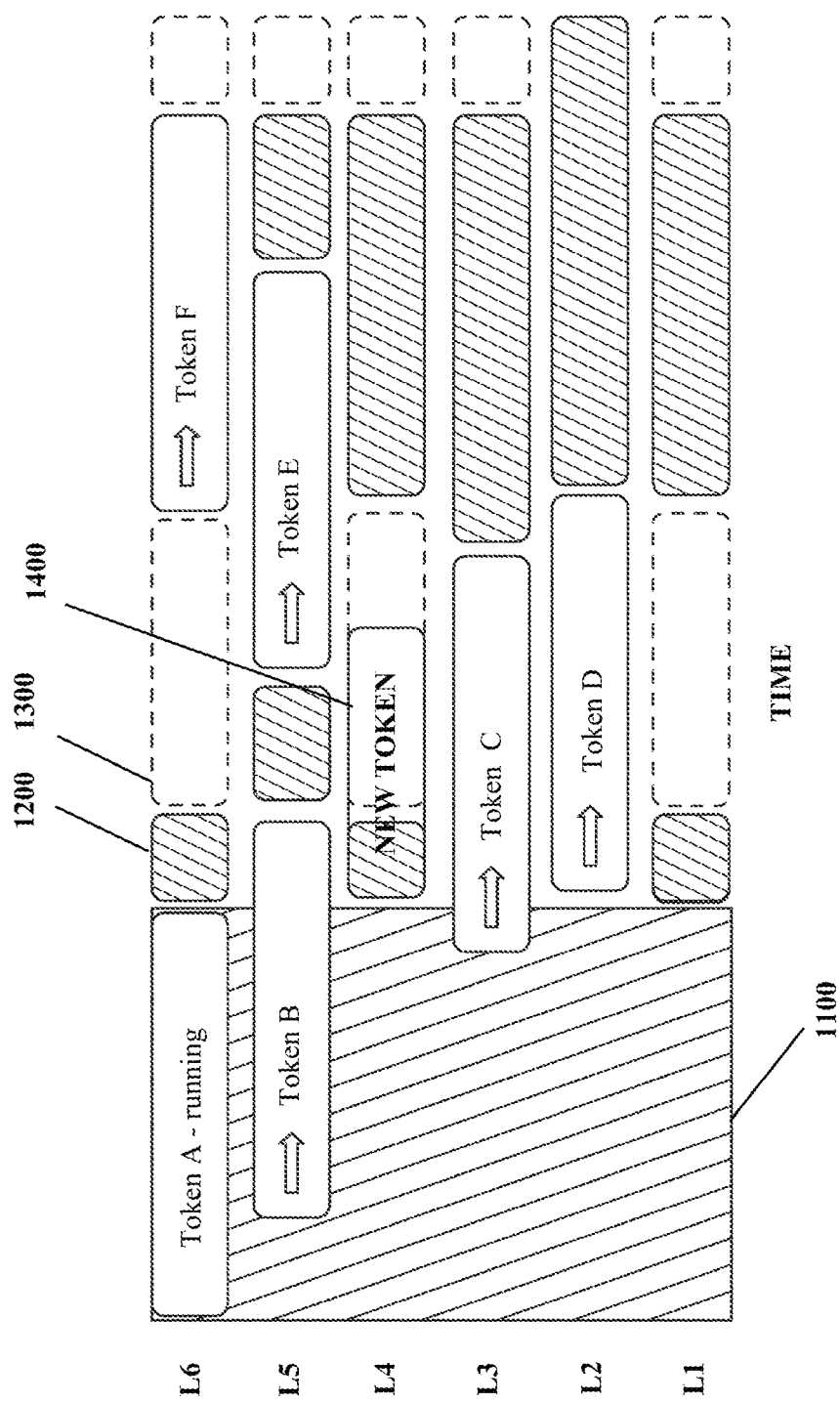
FIG. 22 is a diagram illustrating the virtual token board depicting the one or more red zones, yellow zones, and green zones according to the flowchart of FIG. 21.

FIG. 22 is a diagram illustrating the virtual token board depicting the one or more red zones, yellow zones, and green zones according to the process flowcharts of FIGS. 19 and 21.

Referring to FIG. 22, the virtual token board may include a time bar and one or more levels L1, L2, L3, L4, L5, L6 corresponding to a space bar. In this example, the new virtual token is incompatible with tokens A, B, and F, and compatible with tokens C, D, and E. Accordingly, there is a red region 1100 that runs until the end of virtual token A, as the new virtual token ("New Token") is not combinable with virtual token A, which is already running. Referring to level 4, there is a drop zone 1300 highlighted in green that starts after the virtual token B, as there is no combinability of virtual token B and the new virtual token. The new virtual token can be combined with simultaneously running virtual tokens C, D, and E. The drop zone ends at the beginning of virtual token F, which is not compatible with the new virtual token. All other regions are highlighted in yellow. Referring to level 5, after the virtual token B, the time gap is yellow 1200. The new virtual token would fit with the simultaneously running virtual tokens C and D, but the gap is not big enough. If the user wanted to put the new virtual token in the gap, the user would have to shift the already planned virtual tokens, in particular token E.

In an example, in response to the user holding the new virtual token in the yellow region, they will be shown in the form of a preview which virtual tokens will be shifted due to the new virtual token. The preview can also be implemented as a veil which overlaps the planning and shows the new position of the moved tokens. In addition, the preview may include adding arrows within or near each of virtual tokens which is proposed to be moved in order to show how the token will be shifted. The arrow may indicate the direction in which the virtual token will be shifted. The logic of shifting can follow different concepts: In one example, the order of cooking programs set by the user originally can be maintained. In this example, the non-matching virtual token(s) cause a shift of a whole "combination block" of each subsequent virtual token. In another example, there can be a complete re-sorting of the virtual tokens such that as few virtual tokens as possible have to be shifted.

Further, in response to an incompatibility of a new virtual token in the yellow region based on an absence of a core temperature layer being available, an automatic alternative program may be recommended. Such programs may include a core temperature substitution with time process. As described in U.S. patent application Ser. No. 13/816,930 and U.S. patent application Ser. No. 14/964,302, depending on a detected load, a core temperature controlled cooking process may be conducted when a user specifies a desired core temperature or desired internal cooking degree. With a fixed specified cooking chamber temperature and a fixed specified humidity in the cooking chamber, as well as a fixed specified set value of the core temperature, a time duration may be set by the cooking program depending on the set values and the detected load. The user can rate the cooking process in order to store preferred cooking programs, and may retrieve stored cooking programs in future uses.

In addition, while it is described throughout the specification that one or more regions or zones on the virtual token board change visual characteristics (such as color) in response to a new virtual token being dragged onto the virtual token board, another example may involve changing of the visual characteristics of the one or more of virtual tokens themselves. For example, in response to a certain time range of x minutes being selected, the virtual tokens which are in the selection area may change in visual characteristic (such as color) depending on their compatibility. Similar to the examples described above, the virtual tokens in the selection area may turn green if they fit within the time range picked by the user, red if they do not fit, and yellow if they fit only when planned tokens are moved.

In one example, the methods described above are further modified in that a leading virtual climate token, also referred to as a master virtual climate token, may be provided and selected by a user. When the user long clicks/long presses on a virtual climate token or consecutively clicks or presses, the virtual climate token becomes the leading virtual climate token. Similarly, the user may change the current leading virtual climate token by a long click/long press or consecutive clicks/presses on a different virtual climate token other than the current leading virtual climate token. In this example, as soon as a virtual token is selected, either by placing the virtual token in a virtual token bar or a virtual token board (placement along the time scale being preferred), the virtual token may be provided as a leading virtual climate token. The leading virtual climate token can then be considered for planning the cooking of a plurality of food products in a single cooking chamber where the cooking of the plurality of food at least partly overlap in time.

The climate associated with the respective leading virtual climate token may be visualized, for example via a pictogram, a text or the like. For example, a color veil and/or a labeling (° C./° F., % moisture, and/or hot/cold) may pop up in a climate window on the display and/or on the virtual token board. The climate of the leading virtual token may be visualized on the virtual token board within the time window allocated to the leading virtual climate token by its cooking program. Other (slave) virtual tokens arranged in the virtual token bar and/or the virtual token board may be marked, e.g. by changing their color, brightness and/or their edges, depending on their climate so that a user may either place one or more of the other virtual tokens from the token bar into the token board (placement along the time scale being preferred) or rearrange the virtual tokens within the virtual token board depending on the climate of the leading virtual token as well as the other (slave) virtual tokens to create his/her own combination. The visualized climate is shown on the virtual tokens on both the virtual token board and on the virtual tokens the token bar.

In an example, feedback may be provided to the user as soon as another virtual token has been placed in or replaced by another virtual token on the virtual token board in order to inform the use whether the placement is advantageous. This feedback may be an emoji such as a smiley, a flushed face, a text, a thumb up symbol, or a thumbs down symbol. In order to determine whether two climates necessary for cooking two food products can be combined and whether it would be advantageous, reference is made to the examples described herein. In a further example, the cooking system may notify the user that there is a problem with respect to the specific placement or replacement of the virtual token by marking the virtual token causing the problem. For example, such marking may be via a zooming, a coloring, a flashing or an arrangement of a window around the problematic token. Any selection or change of the leading virtual climate token may be done by a prolonged touch, double touch, or other predetermined touch operation of the virtual token.

As soon as virtual tokens have been selected and displayed in the virtual token bar, a proposal for arranging the virtual tokens within the virtual token board may be provided or shown. This may assist a user with a cooking plan in a commercial kitchen. In addition, a proposal for the rearrangement of virtual tokens within the virtual token board may be provided based on a determination on whether it would be advantageous, as described below. Any proposal may be provided optically, acoustically, and/or animated.

It may be determined whether different food items may be cooked together as follows. If, for example, four different items are to be cooked at the same temperature and the same flow rate but different relative humidity in the cooking chamber of a cooking appliance, the optimum humidity (OF) for simultaneous cooking of the food may be determined, taking into account setpoint values of the relative humidity (SF) of the individual food items and the associated tolerance ranges from a minimum humidity (minF) to a maximum humidity (maxF) determined by first averaging over all Target values. And then it is checked whether the determined mean value is within the tolerance ranges of all food. The following is a table illustrating this provision:

| Cooking product no. | minF in % | SF in % | maxF in % | weighting factor |
|---|---|---|---|---|
| 1 | 40 | 50 | 60 | 2 |
| 2 | 60 | 70 | 80 | 3 |
| 3 | 40 | 40 | 60 | 1 |
| 4 | 70 | 70 | 100 | 4 |

It is determined mathematically for the four food items of the table, the mean target humidity to 57.5%. This average is only within the tolerance ranges for the food items number 1 and 3, so that only these can be cooked at the same time. The optimum relative humidity is determined as the mean value of the target values for the food items 1 and 3 to 45%. For the items 2 and 4, an individual examination mathematically gives an average relative humidity of 70%, which is also within the respective tolerance ranges, so that also the items 2 and 4 can be cooked at the same time, with an optimum relative humidity of 70%. Thus, the four food items can not all be cooked at the same time, but it must be successively cooked on the one hand the food items number 1 and 3 and on the other hand, the food items number 2 and 4, which is displayed on a display device of the cooking appliance.

This example illustrates this in which both the setpoint values and the tolerance ranges are taken into account in comparison with a method in which only ranges are taken into account. Considering only areas would mean that food items 1, 2 and 3 could be cooked at the same time due to the overlap of their moisture content, with a relative humidity of 60%. However, this does not lead to the desired cooking results of all three items.

This method also makes it possible to provide the different food items with weighting factors which are determined, for example, by the purchase price and the sensitivity of the food. Then, the mean value may no longer be determined from the purely mathematical mean, but from the mean resulting from a multiplication by the weighting factor. For example, according to the above table, the following results are obtained: $(2\times50+3\times70+1\times40+4\times70):(2+3+1+4)=63$.

In this example, the average relative humidity is 63%. This then means that this average is within the tolerance for the food items number 2 and 4 exclusively, so only these two food can be cooked at the same time, while the food items number 1 and 3 can also be cooked at the same time, even considering the weighted average. In contrast to the case without the weighted average, an optimum relative humidity for the food items of the numbers 1 and 3 now amounts to 46.7%, and for the items 2 and 4, the optimum relative humidity, taking into account the weighting factor, is calculated again at 70%

In addition, for example, if one exclusively uses the requirements of moisture in a cooking chamber as a distinguishing feature between different cooking processes, it is possible to consider whether steaming takes place during a cooking process. Alternative distinctions may be as follows:

1=Must not be steamed under any circumstances, as the food to be cooked is sensitive to moisture.

2=It can be steamed because the food is insensitive to moisture.

3=It must be steamed since the food needs moisture.

It follows that the cooking processes 1 and 2, 1 and 3 cannot be combined, but only the cooking processes of 2 and 3. With regards to the determination of an optimum temperature and/or an optimum fan speed, the determination of an optimum relative humidity can be applied in the same way described above.

Figure 23:
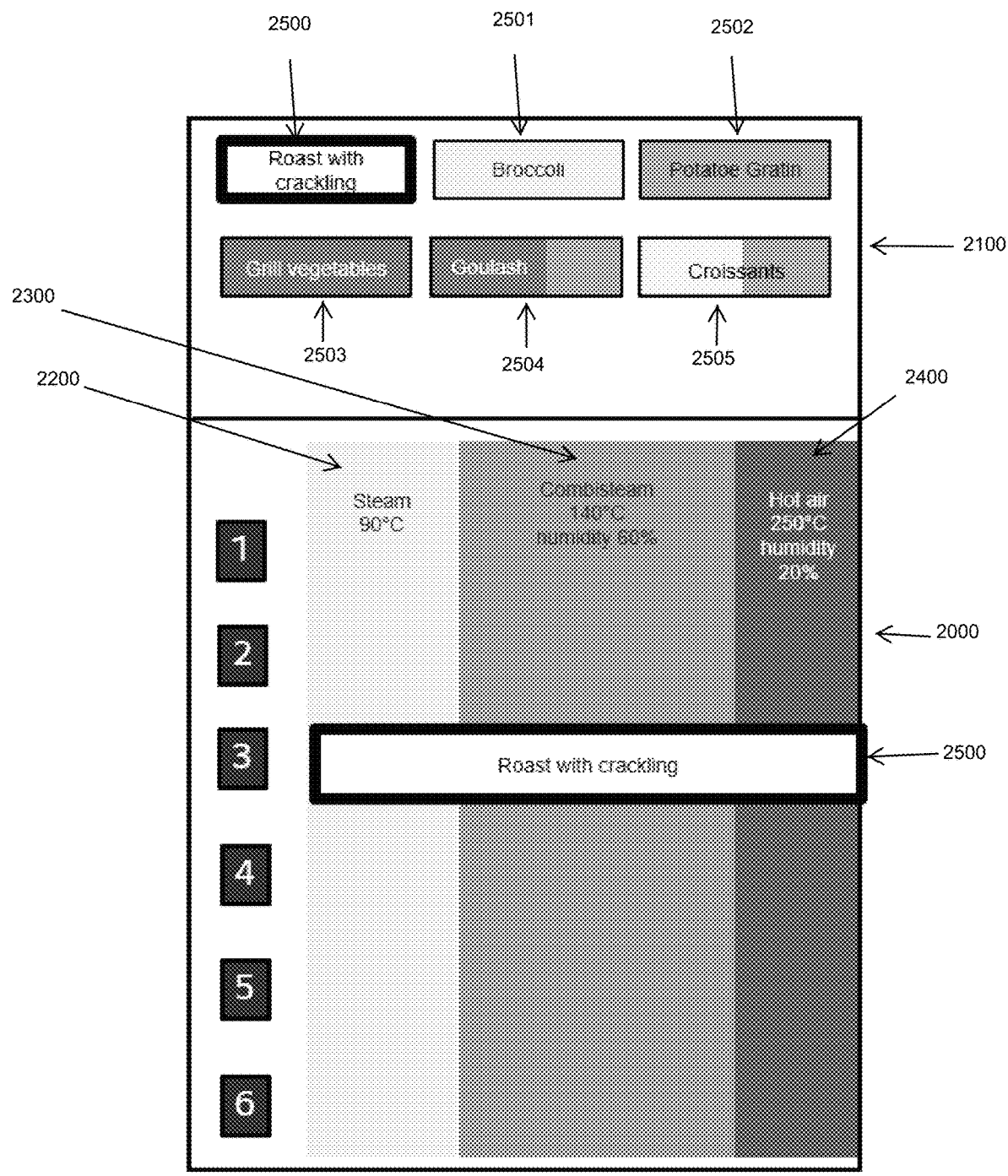
FIG. 23 is a diagram illustrating the leading virtual climate token on the virtual token board.
Figure 24:
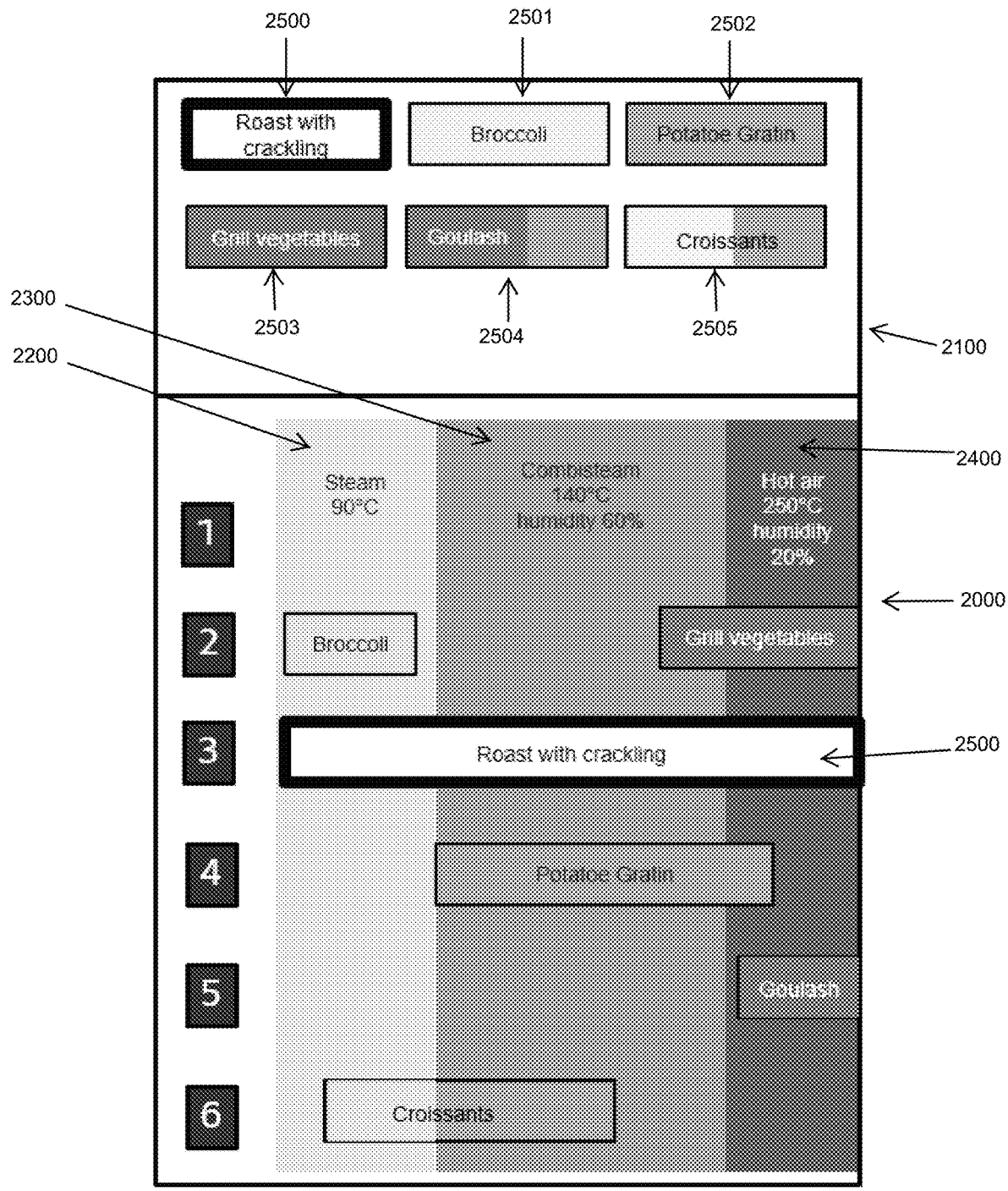
FIG. 24 is a diagram illustrating all virtual tokens on the virtual token board.

FIGS. 23 and 24 show an example of the leading virtual token embodiment. According to FIG. 23, there are six food products to be cooked, and their respective cooking programs can be obtained via the six virtual tokens 2500-2505 placed in the virtual token bar 2100. The climate of the cooking programs/recipes characterized by said six virtual tokens 2500-2505, are listed in the following:

Virtual token 2500, product: Roast with crackling: Steaming at 90° C., Roasting at 140° C., Over crusting at 250° C.

Virtual token 2501, product: Broccoli: Steaming at boiling temperature.

Virtual token 2502, product: Potato gratin: Roast at 130° C.

Virtual token 2503, product: Grilled vegetables: grilling at 240° C.

Virtual token 2504, product Goulash: searing at 260° C., braising at 120° C.

Virtual token 2505, product: Croissant: steaming at boiling temperature, frying at 160° C.

In FIG. 23, the virtual token "Roast with crackling" 2500 is drawn onto the virtual token board 2000 and selected as the leading virtual climate token. After selection, virtual token "Roast with crackling" 2500 is highlighted (for example in a shining yellow color), and its time window is colored such as to represent the climatic zones of the three cooking program phases or levels associated with the virtual token "Roast with crackling" 2500. The first phase 2200 is steaming, then roasting 2300, and lastly over-crusting 2400. Accordingly, there are three color zones on the virtual token board as shown in FIG. 23. The remaining five virtual tokens 2501-2505 in the virtual token bar 2100 that have not yet been placed on the virtual token board 2000 are colored according to their own climate (whether or not those virtual tokens' climates are compatible with the climate of the leading virtual token). This provides the user with an indication of how well the remaining virtual climate tokens 2501-2505 fit with the climate associated with the leading virtual climate 2500. If the cooking programs of the remaining virtual climate tokens 2501-2505 are multi-level (have more than one cooking climate associated with then) then the coloring of those virtual tokens is also multi-level, as is shown for the Goulash 2504 and Croissants 2505. While a long click or consecutive clicks on any virtual climate token will assign that token as leading virtual climate token, a short click on any virtual climate token will cause an information window about its climate to appear.

As is shown in FIG. 24, the user can place the remaining virtual tokens where he/she wants, whether suitable or not, on the virtual token board 2000. The color scheme on the virtual token board 2000 that is based on the climatic zones of the leading virtual climate token, as well as the colors on the remaining virtual tokens provides the user with an indication on suitable placement. The climate in the cooking chamber or the cooking appliance is determined by the climate(s) associated with the leading virtual climate token. FIG. 24 shows the virtual token board after the user has placed all six virtual tokens. In the example shown, the user must accept that the grilled vegetables start out too cold and the potato gratin ends up too hot. The overall performance of this selection can be evaluated and the user can obtain feedback as is discussed above.

In an aspect, at least one object of the invention is further simplification of an operation of a cooking device, in particular, a simplification when setting time sequence or course plans, function plans and/or function sequences of programs for cooking devices is made possible.

This object is attained, as an example, due to the fact that each program representative includes a virtual token.

Here, it can be provided that each program is selected from a group comprising cooking programs, in particular determined by cooking operating modes, cooking processes, cooking parameters and/or items of food to be cooked, cleaning programs, in particular determined by cleaning modes, cleaning processes, cleaning parameters and/or cleaning agents, auxiliary or assistance programs and/or diagnostics programs and/or each virtual token comprises a code name and/or a graphic illustration for the corresponding program.

According to the invention, a program which is compiled of several sections is represented by a virtual token with several partial tokens, wherein partial tokens relating to program sections which can be separated from each other can be displayed in separate areas on the display device.

Furthermore, it is recommended according to the invention that via a dimensioning, in particular a width, of a virtual token and/or a partial token, at least a parameter which is characteristic of the duration of the corresponding program or program section is visualized, and/or the sequence of the program is visualized on the corresponding token and/or the sequence of the program section is visualized on the corresponding partial token, such as from left to right.

It can in turn be provided that through visual emphasis and by changing a cross-hatch, color and/or color intensity, altering the surrounding frame, flashing, underlining or similar, at least one area of the token displays during the sequence of the corresponding program the progress of the program and/or at least one section of the partial token displays during the sequence of the corresponding program section the progress of the program section.

Methods according to the invention can furthermore be characterized by the fact that by means of cross-hatch and/or color identification of a virtual token and/or of a partial token, at least one parameter which characterizes a cooking area climate of the corresponding program or program sections is visualized, wherein the cooking area climate parameter is preferably determined by a temperature such as a cooking area temperature and/or a cooking area wall temperature, such as a pan base temperature, cooking area humidity, cooking area flow speed, cooking area pressure and/or microwave energy in the cooking area, and/or the location of a cross-hatch and/or color change indicates when a change in cooking area climate occurs or will occur.

It is also preferred according to the invention that by means of a geometric form, such as on the left and/or right-hand side, of a virtual token and/or of a partial token, at least one parameter is visualized which characterizes the corresponding program or corresponding program section, such as for a cooking area climate and/or at least one cooking function device for implementing the program or program section in a cooking device.

Furthermore, it can be provided that by means of a dimension, in particular by means of height of a virtual token and/or partial token, at least one parameter is visualized which characterizes an area requirement of the corresponding program and/or program section in the cooking area of the cooking device, wherein the area requirement parameter preferably characterizes a cooking zone, and in particular determines at least one treatment level and/or one treatment zone in a treatment level.

It can also be provided according to the invention that a time succession of the sequences of programs and/or program sections and/or an area arrangement of food items belonging to the programs and/or program sections, such as in the form of food items to be cooked with cooking programs and/or cooking program sections, or cleaning agents with cleaning programs and/or cleaning program sections, in order to optimize the use of resources, a time schedule and/or a program result and/or in order to reduce loss in cooked food weight, the accumulation of dirt, the creation of smoke and/or a smell can be selected depending on the dimension, cross-hatch, color and/or geometric shape, wherein the geometric shapes are preferably in the form of a key-lock logic.

Furthermore, it is recommended according to the invention that for each selected program, the corresponding virtual token, preferably together with the color, cross-hatch, dimension and/or geometric shape, and/or for each selected program section, the corresponding virtual partial token is created, preferably with the color, cross-hatch, dimension and/or geometric shape displayed on the display device, such as in a token bar and/or on a token board.

It can also be provided that in order to visualize a function plan and/or a function sequence, a plurality of virtual tokens and/or partial tokens can be displayed for at least one cooking device, and/or virtual tokens and/or partial tokens can be displayed depending on a determined time period, a determined cooking device, a determined treatment level of a cooking device and/or a determined treatment zone of a treatment level, preferably in such a manner that they are different and/or can be selected or changed via an input device, and/or virtual tokens and/or partial tokens comprise at least one additional marking, in particular to identify a prioritization of at least of one program parameter, a time specification, a treatment level, a treatment zone and/or a cooking device.

Additionally, it can be provided according to the invention that virtual tokens and/or partial tokens can be changed, in particular via an input device, wherein preferably, a change comprises an enlargement, a reduction, a displacement and/or a change to the color, cross-hatch, dimension and/or geometric shape.

The invention also provides a cooking device with at least one function device for implementing at least one program and a control for regulating a device which is operatively connected to an input device, a display device and the function device for implementing a method according to the invention, wherein the function device comprises a heating device, comprising at least one electrical heating element, a gas burner, a thermal exchanger and/or a device for radiating electromagnetic radiation into the cooking area, in particular in the form of a microwave source, a device for introducing humidity into the cooking area comprising at least one steam generator, a water evaporator and/or steaming device, a device for removing humidity from the cooking area comprising at least one fresh air feed and/or a condenser, a device for circulating cooking area atmosphere comprising at least one fan and/or a pump, a device for applying a pressure in the cooking area comprising at least one locking device and/or a cleaning device.

It can also be provided that the cooking device comprises a display device or is connectable to the display device, that the cooking device comprises the input device or is connectable to the input device, and/or that the cooking device is connectable to a plurality of further cooking devices.

Finally, it can be provided that the input device comprises an electronic menu, a device for recording movements of an operator and/or a touch screen, and/or that the display device comprises a touch screen, and/or is combined with the input device.

The invention is thus based on the surprising discovery that via a display device, the operation of a cooking device is simplified by means of a display of programs, in particular cooking programs, preferably determined by cooking modes, cooking processes, cooking parameters and/or items of food to be cooked, of cleaning programs, in particular determined by cleaning modes, cleaning processes, cleaning parameters and/or cleaning agents, of auxiliary programs, diagnostic programs or similar, by using program representatives in the form of virtual tokens, for example in an at least two-dimensional area, in particular in the form of a virtual token board with either a time axis and at least one position axis or at least two position axes and/or in a virtual token bar, since the tokens in restaurants are used in digitalized form. No re-training of kitchen staff is therefore required, while at the same time, communication errors can be reduced when a request made by a restaurant guest can be displayed on a display device in a kitchen of the restaurant and also directly processed.

Virtual tokens can for example be arranged in a virtual token list below, alongside and/or adjacent to each other, in particular in the chronology of the selection of the corresponding programs and/or depending at least on one optimization or priority parameter.

Furthermore, a simple time arrangement of virtual tokens can be made possible on the virtual token board, wherein each virtual token comprises a code name and/or a graphic illustration for program and can be deposited on a time bar or along said time bar. On the time bar, at least one point in time and/or a time period of at least of one selected program, function plan and/or function sequence can be visualized. Additionally, a simple area assignment of the virtual token to treatment zones of a plurality of treatment zones, e.g. determined by insertion levels of at least one cooking device according to the invention can be realized by means of the fact that with a virtual token board, at least one treatment level of a cooking area is depicted by a first position axis, and at least one two-dimensional treatment zone in each treatment level is depicted by a second and third position axis. The respective axes of the token board, selected from the time axis and/or from the first, second and/or third position axis, are here preferably positioned vertically on top of each other.

Both, the virtual token board and/or the virtual token bar as well as a function or sequence plan and/or a function sequence which are determined by it can be displayed graphically on the display device and stored in a storage device. A stored function or sequence plan and/or a function sequence can be retrieved at any time.

Furthermore, a further simplification of the creation of the sequence plan of programs e.g. for cooking items of food to be cooked and/or for implementing cooking programs, cooking modes, cooking processes and/or cooking stages, can be achieved when a shared input and display device in the form of a sensor screen or touch screen intuitively enables the user to deposit the virtual tokens onto the virtual token board, e.g. from the virtual token bar along the time bar to the position coordinates of the treatment zones, e.g. using "drag and drop" and/or by touching, approaching, removing, passing over, pulling apart and/or pulling together at least one auxiliary device, in particular in the form of a pin, a pointer, and/or a cursor. A clear color and/or geometric display of the virtual tokens supports e.g. an intuitive assignment of items of food to be cooked together and/or cooking programs and/or cooking stages which are to be implemented jointly.

The display device can be installed in a cooking device according to the invention. It can however also be used for communication with a plurality of cooking devices which are operatively connected to each other. The cooking devices can here also be different, e.g. they can fulfil the function of a cooking device known commercially as SelfCooking Center® or Vario Cooking Center®. Each cooking device according to the invention can be equipped with an input device and/or be operable via a remote input device, wherein the remote input device can be designed in the form of an electronic menu. It is also feasible that the display device and the input device be designed in the form of a touch screen as part of a cooking device and/or communicating separately via cable or in a wireless manner with at least one cooking device.

Furthermore, it can be provided that the method according to the invention is used for creating a joint sequence plan for a plurality of cooking devices which are networked to each other. Here, via a display and input device in the form of a touch screen, the control, display and/or creation of sequence plans can be conducted for each cooking device which is connected to the display and input device. In order to change the control, display and/or creation of sequence plans between different cooking devices, a button, switch or similar can be provided, wherein there is also the option to "scroll" between menu levels of different cooking devices via a touch screen.

It is furthermore possible to provide a virtual token board on a first area of the display device and/or a virtual token bar on a second area of the display device, wherein a selection can be made whether the first and/or the second area is or are displayed, and/or in which size, color, form and/or brightness the first and/or the second area is or are shown. It can also be provided that a free selection can be made as to where the first and/or the second area is or are displayed.

A creation of a virtual token which e.g. depicts the cooking of a cooking device, determined by a cooking program, can be conducted by a user in such a manner that first a cooking program is selected, for example as determined by a cooking mode such as "meat", then a cooking process such as "roast" is selected, and finally, at least one cooking parameter such as a "degree of browning" and/or a "core temperature" is selected. The corresponding virtual tokens can then be shown on a virtual token board and/or in a virtual token bar in a display area of the input and output device.

A selection of a cooking program can for example then be made in which a user is shown the operating modes which can be implemented by the cooking device according to the invention on the touch screen in the form of a main operating menu. For example, when an operating field is touched, e.g. in the form of a digital button, a plurality of operating fields which through letters, numbers, colors, symbols and/or geometric forms are representative of the cooking modes, a user makes a first selection. Subsequently, as an option, a first sub-operating menu can open in which the processes which correspond to the selected operating modes appear, so that in turn the process can be selected via operating fields. It can be provided that for further settings such as for setting a cooking parameter at least a second sub-operating menu can be opened. The cooking program thus selected can comprise a plurality of cooking stages, wherein each cooking stage depicts a program section.

Prior to generating a virtual token by a cooking device according to the invention, it can be provided that a user confirms a selection which has been made. Alternatively, temporary virtual tokens can be generated which have not yet been confirmed, wherein confirmed and non-confirmed virtual tokens can differ in the way in which they are visualized. Furthermore, it can be provided that confirmed or not yet confirmed virtual tokens can be differentiated by the user on the display device, in particular on the virtual token board, by means of a separate graphic display. It should be understood that any type of program, for example in the form of cooking programs, can be displayed as virtual tokens. Furthermore, any number of virtual tokens can of course be provided on the virtual token board.

A graphic display of virtual tokens can differ by means of visual emphasis, for example in terms of geometric form, size, a change to a cross-hatch, a change in frame, flashing, underlining, color intensity and/or a color. It can be provided that virtual tokens which are cooked in a specified cooking area climate are identified by means of a corresponding color which stands for the special cooking area climate. Progress during a progress sequence can also be emphasized visually. Furthermore, it can be provided that items of food to be cooked which must proceed through more than one cooking stage until they are fully cooked are shown in at least two colors, wherein e.g. a place in which the visual emphasis changes visualizes a change in cooking area climate. It is also feasible that the color identification of virtual tokens in several colors is conducted in such a manner that a succession of the required cooking area climates can be recognized. For example, a cooking area climate in which both "fish" as well as "poultry" can be roasted, can be shown in the color red. A "steaming mode" which requires a different cooking area climate can be labelled in blue, for example. Virtual tokens can here be color coded in such a manner that a cooking area climate which is required first is shown on the left on a virtual token, and the subsequent cooking area climates are shown from left to right on the virtual token.

A depiction of the time sequence of virtual tokens can be made in such a manner that a fixed, scalable time window over a specific period of time, such as three hours, can be shown on the display device. The fixed time window thus shows only a section from a production plan which is designed e.g. to cover the kitchen operation for one day, so that programs which run respectively, such as cooking programs, can run automatically in specific time intervals such as from right to left, and preferably in real time, through the section of the production plan shown in the time window. Here it can be provided that the time intervals are correspondingly short, so that a displacement of the virtual token shown runs in a flowing manner for the human eye in the time window. It can also be provided that the time window shown can be reduced and/or increased in size as required, wherein for example it can be scaled by means of gesture control and/or when touching the time window with a finger and then moving the finger, an alternative time section of the production plan can be displayed in the time window. It is also possible that another time section can be set by directly entering a start and/or end time point or an alternative time period, or that an enlargement and/or reduction is possible by means of a symbolized magnifying glass function.

Furthermore, it can be provided that no fixed time window is shown, but by touching a sensor screen or touch screen with a finger and then moving the finger to the side, sections which lie in the past again become visible or sections which are due to run in the future can be shown, wherein the time window is moved along the time bar which can be shown by means of a time axis.

It is also possible that in the time window, one or more partial areas can be visually emphasized. For example, an enlargement or zoom function can be provided which makes it possible to show in enlarged form within the zoom area those virtual tokens, texts or similar which are located within the zoom area or which move into it. Alternatively, enlargement, reduction in size, flashing, change in frame, change in color, change in brightness and/or an additional symbol is or are possible as a visual emphasis. If virtual tokens leave the zoom area, their display can automatically be reduced back to its original size. Furthermore, both the position of the partial area can be determined with the zoom function together with its time extension. A determination of the zoom area can for example be made by turning a setting wheel by a user, or by moving the zoom area with a gesture control according to the functions described for moving a displayed time period in the time window. Here, a position and a width of the zoom area can be freely selectable, and it can also be provided that touching a virtual token can also result directly in an enlarged display. Furthermore, a degree of enlargement and/or reduction can be freely selectable in the zoom area.

It can also be provided that virtual tokens can be differentiated on the basis of their geometric form. In general, any number of geometric forms required are suitable for differentiating the virtual tokens. Furthermore, it can be provided that the geometric form of the virtual token already enables a result to be reached regarding an optimum sequence of the cooking for optimizing consumption of resources, a time schedule and/or a programming result and/or to reduce loss of weight in the cooked food, accumulation of dirt, generation of smoke and/or a smell, wherein the geometric form of the virtual tokens clearly indicates a specific cooking sequence to the user by means of a graphically displayed key-lock symbol on a left and/or right-hand edge of the virtual token. Here, a parameter which characterizes the corresponding program can be visualized by means of the geometric form, wherein on at least one token bar, virtual tokens of the selected programs are shown which can be congruent in at least one parameter of the program and/or in the arrangement relative to at least one position axis and/or the time axis. Furthermore, it can be provided that a combination consisting of a specific geometric form on a left and/or a right-hand edge of a virtual token and a color identification is possible.

Here, a congruence between a right-hand edge of a first virtual token and a left-hand edge of a second virtual token and/or a color congruence between the right-hand edge of the first and the left-hand edge of the second virtual token can depict an optimum succession of an implementation of programs, in particular of cooking programs. If there is no congruence in the edge areas, there is no optimum succession to the extent that for example an adaptation of the climate must be made in the cooking area. Furthermore, it should be noted that the time sequence of a cooking program is not only possible from left to right in a token, but that other identifications are also possible, such as from top to bottom or similar.

It can furthermore be provided that instead of or in addition to the color identification described above and the special geometry on the left and right-hand edge, further information can be made accessible to the user via alternative graphic identifications. On the virtual token board, any number of virtual tokens required can be deposited, depending on the type and number of cooking devices according to the invention which are operatively connected to them. In order to differentiate between the virtual tokens on the virtual token board, it can be provided that an identification of the virtual tokens is shown adjacent to and/or close to the respective virtual token with a label and/or a symbol which e.g. depicts the respective cooking device.

It can also be provided that virtual tokens can preferably be enlarged, reduced and/or changed in terms of their color, their position and/or their geometric shape, in particular by means of an input device.

Furthermore, it can be provided that virtual tokens can be pre-sorted by the user on the virtual token board using "drag and drop". A pre-sorting of this type according to the priorities of the user can simplify a subsequent creation of a sequence plan. Furthermore, when the user operates the touch screen and/or actuates a separate input device, a targeted enlargement and/or reduction in the display of the virtual tokens on the virtual token board can be possible, wherein the degree of enlargement or reduction can be individually set by the user. It is also provided that only a specific number of virtual tokens are shown on the virtual token board, and the user makes a selection of the virtual tokens to be displayed by making an entry on a regulator or controller which can be virtual as an option, e.g. in the form of a rotating head, rotating regulator, sliding regulator and/or rotating wheel. Other selection methods such as "touching" or "marking" an area with one or more fingers are naturally also possible.

It can also be provided that at least one area is designed as a display alteration area on a display device in such a manner that at least one virtual token board and/or one virtual token bar can be pulled onto this display alteration area, for example using "drag and drop", and thus a simple alteration of the virtual token board and/or of the virtual token bar from a first pan onto that of a second pan and/or onto that of a first level onto a second level of a cooking device. Furthermore, the area can also be designed for enabling a corresponding alteration between at least two cooking devices.

An alteration to a virtual token, token board and/or token bar, in particular moving onto a display alteration area, can lead to an alteration in the visual depiction, in particular determined by the size, color, cross-hatch, shape and/or brightness, and/or in the position of the displayed areas on the display device.

Instead of moving a virtual token board and/or a virtual token bar, individual virtual tokens can be moved using "drag and drop" onto an area which is provided for an alteration e.g. between pans, levels and/or cooking devices. Here, when a virtual token is moved from one first virtual token board shown onto the area of a display alteration, this can lead to a depositing of the virtual token onto a second virtual token board. Several areas can also be provided on an input and display device, so that each area can stand for a specific pan, a specific level and/or a specific cooking device.

It is also possible to exclusively change the display of the levels, pans and/or devices shown.

The virtual tokens shown in the virtual token bar are preferably all shown with the same width. The height of the virtual tokens shown can however contain information regarding the necessary area requirements, such as the number of insertion levels of a cooking device according to the invention. A virtual token which is double the height accordingly requires double the number of insertion levels of a cooking device according to the invention. A corresponding visualization of treatment zones at a treatment level is also possible. However, the width of the tokens can differ, and can serve to display the duration of the corresponding program. Accordingly, a token of a longer program would be wider than the token of a short program. It can also be provided that the width of the tokens is only set depending on the duration of the corresponding program when the tokens have been deposited along a time bar and/or on a token board.

Thus, the user can be informed regarding the respective implementation time through an alteration in the length of the virtual token. While on the virtual token bar, for example, all virtual tokens preferably have the same width, this is shown according to the relationship of the duration of the respective cooking stages when deposited on the time bar.

Furthermore, it is possible for a virtual token to be subdivided into at least two virtual partial tokens, according to the different cooking stages which run for a cooking program, wherein preferably, partial tokens depicting program stages which can be separated in time from each other can be shown in separate areas on the display device. Here, it can be provided that a color and/or geometric identification of the virtual token is created. For example, a virtual token for a cooking program consisting of a first cooking stage, "steaming", which e.g. comprises a third of the required overall cooking time, and a second cooking stage, "roasting", which comprises the remaining cooking time, can be identified by a color in such a manner that a first third of the virtual token on the left-hand side is kept in a color which clearly stands out from the color of the subsequent two-thirds of the virtual token. Due to this type of color identification, it can for example already be seen on the virtual token board which time portion the different cooking stages require for the virtual token. A possible division of a virtual token can also be clearly shown by a symbolized dividing line.

It is also provided that a virtual token can be displayed before a time and/or area arrangement on at least one virtual token board in at least one virtual token bar.

In order to create a sequence plan for implementing programs which are depicted by virtual tokens, for example in the form of cooking programs, in a cooking device according to the invention, a graphic arrangement of the virtual tokens on a time bar, which is as an option restricted from one start time and/or one end time, in such a manner that a user can deposit the virtual tokens from the virtual token bar using "drag and drop" at required points in time and in a required succession along the time bar in the virtual token board. If a cooking device according to the invention has more than one treatment level, e.g. several insertion levels, these insertion levels are shown according to a coordinate system consisting of a time axis in the form of a time bar and a position axis for the insertion levels, i.e. two-dimensionally. If furthermore, a plurality of treatment zones is provided at each insertion level, this can be reflected by at least one second position axis, so that ultimately, a three-dimensional depiction of the virtual token board is created.

As an alternative to the three-dimensional depiction, it can be provided that after an insertion level is selected, instead of a depiction in a second position axis, an alteration is conducted in the depiction in such a manner that in a display area, a selected area is shown, wherein a plurality of treatment zones is shown, e.g. by means of a pictogram depiction. Here, the time axis continues to be shown in the form of a time bar, and virtual tokens can be deposited on the treatment zones which are shown in the form of pictograms. Here, it can be provided that when virtual tokens are transferred from the virtual token bar, a required number of treatment zones is identified. An alteration between depictions can be implemented by touching an input field, turning a rotating regulator and/or automatically by virtually depositing a token on an insertion level.

Even four-dimension depictions are possible, i.e. with three spatial dimensions and one time dimension. Within a multi-dimensional area, depictions can be projected with smaller dimensions, or moved, reduced in size and/or enlarged, analogous to the manner which is a time window described above is handled.

The creation of a sequence plan by the user is simplified by the graphic features of the virtual token described, which include color identification, special geometric shapes or virtual partial tokens. It can also be provided than an arrangement is made depending on at least one parameter of at least one virtual token which is arranged on a virtual token board, together with an arrangement of at least one other virtual token which is to be arranged on the token board with at least one other parameter, and that each parameter is at least characteristic of one cooking device, a function element of the cooking device, a treatment level of the cooking device, a treatment zone of the treatment level, a point in time, a time period, a prioritization and/or a climate value of the program which corresponds to the respective virtual token.

The creation of the sequence plan can preferably be further simplified by the fact that automatically, no depositing is permitted of virtual tokens of different colors and/or shapes, and which accordingly require different cooking area climates, in such a manner that they are below or above each other, or partially overlap each other, i.e. that they are deposited at the same time point on the time bar at different or the same treatment zones.

As has already been mentioned, it can be provided that virtual tokens can be prioritized by means of a priority parameter, wherein the parameter which is characteristic for a prioritization (priority parameter) is in particular determined by energy consumption, water consumption, cleaning agent consumption, time requirement and/or area requirement and/or a reduction in weight of the cooked food, accumulation of dirt, creation of smoke and/or a smell, and/or an improvement in a program result, such as the quality of a fully cooked item of food and/or of the cleanliness of a cooking area. A positioning of a first virtual token with a high priority in an identical area and/or time to an already positioned second virtual token with a lower priority can even lead to an automatic re-arrangement of the second virtual token.

A parameter which characterizes a climate value (climate parameter), which is determined by a temperature, a degree of humidity, a pressure, a flow speed and/or a level of microwave energy in a cooking device, in particular in a treatment level and/or treatment zone, can also be taken into account, either as an alternative or cumulatively.

Furthermore, the user can be provided with a supporting function which displays orientation lines in the form of "catch lines" in accordance with a start or end point of a virtual token. If a user moves a virtual token e.g. from the virtual token bar using "drag and drop" to a required position on a virtual token board, the catch lines will be displayed to them as an orientation for possible depositing points.

For example, it is possible that catch lines can be displayed which relate to a reference time point on a time bar which has been specified by a user, which can simplify the completion of cooking stages at specific points in time. The catch lines are e.g. displayed on the left-hand and right-hand end of the virtual token or partial token, vertical to the time axis.

Furthermore, it can be provided that for a cooking device according to the invention which has more than one insertion level, catch lines are also displayed horizontally along the lower and/or the upper end of the virtual token. It can be provided that catch lines which depict a limitation of insertion levels are permanently displayed. When a user "releases" a virtual token, for example, at a specific distance from a catch line, the virtual token can automatically be arranged in accordance with the catch lines which are positioned nearest. A display of the catch lines is also optional when virtual tokens are moved with a sequence plan.

It is also possible to arrange the virtual partial tokens described at different time points on a sequence plan and to align them to catch lines. This can occur for example when an item of food to be cooked requires an interim treatment stage outside of a cooking device, and subsequent to the interim treatment stage, the cooking device must be re-loaded with the item of food to be cooked. However, pre-cooking and finishing can also be depicted using two virtual partial tokens.

It is also possible to display the progress during a sequence of at least one selected program, function plan and/or function sequence in the area, for example using at least one time indicator along the time axis.

Additionally, it can be provided that sequential progress bars are displayed which can depict the progress of the respective cooking stages of the virtual token, alongside and/or close to the respective virtual token. As an alternative or supplement to the depiction of progress bars, it is also possible to depict on, adjacent to or close to the respective virtual token a numerical residual time display. It can also be provided that a sequential progress bar for all virtual tokens together is graphically depicted, or a shared residual cooking time is displayed numerically. It is noted that any graphic depiction of residual cooking times required is possible, e.g. via an analog clock, kitchen items or similar. Certainly, both the progress and the residual cooking time can be regarded as program parameters, which can be visualized in the form of an additional marking on a token and/or a partial token.

Furthermore, it is possible for a critical path of the virtual token to be displayed to the user, which makes it clear to the user that all the virtual tokens which are emphasized by means of the critical path must be loaded and/or unloaded at precisely the times given in order to maintain the sequence plan. A delay in the sequence of the critical path should therefore be avoided as far as possible. A critical path can thus identify programs to be prioritized, so that the critical path can also be regarded as an additional marking of a token and/or partial token, and depends on the corresponding priority parameters.

An automatic creation of a sequence plan by a cooking device according to the invention is also possible. For the automatic creation of a sequence plan, it can be provided that virtual tokens can be optimally arranged depending on parameters which are selected by a user. An automatic arrangement can here be made with regard to energy considerations, the shortest possible time for device usage and/or a minimum time. In general, an optimization of the arrangement can also be provided under other parameters (priority parameters), which are suitable for optimizing a time sequence of virtual tokens.

Further priority parameters are for example determined by a required reduction in weight loss, reduction in accumulation of dirt, and a reduction in smoke and/or smell. Defined pauses between individual tokens, for example every two minutes, can be specified instead of a time point specification, and regarded as an optimization.

It can also be provided that a user specifies any number of virtual tokens required at a specific time point. These can for example be virtual tokens which are representative of dishes in a lunchtime menu, which must be fully cooked at a fixed time point. Other individual orders made by guests in a restaurant can then for example be optimally arranged by a cooking device according to the invention around the virtual tokens which have a specified time. Furthermore, it can be provided that a graphic differentiation is made between virtual tokens which are at a fixed time, and variable virtual tokens.

Furthermore, it can be provided that an automatic re-arrangement of a sequence plan can be conducted following a re-prioritization made by the user. If the user requires a manual re-prioritization of the virtual tokens, this can lead to a new, automatically optimized sequence e.g. of all virtual tokens which have not been manually re-arranged. Furthermore, it can be provided that a user changes selected priority parameters subsequently, according to a re-prioritization, and a new sequence plan is created according to the changed parameters.

In general, optimization methods for the described automatic arrangement of the virtual tokens are well known in the prior art. In particular, a use of linear optimization methods such as Simplex methods, inner point methods and/or ellipsoid methods, are provided in a cooking device according to the invention.

The features of the invention disclosed in the above description, the claims and the drawings can be essential both individually and in any combination required for the realisation of the invention in its different embodiments.

What is claimed is:

1. A cooking device configured to conduct at least two cooking programs corresponding to cooking at least two food products with an overlap in cooking time, comprising:
    a single cooking compartment for cooking the at least two food products, wherein the single cooking compartment has a plurality of cooking areas; and
    a processor which is configured to execute steps comprising:
        displaying a virtual token board comprising a time scale which provides time information indicating a time when the at least two food products will be cooked, and a space scale which provides an indication of a location which provides information on the plurality of cooking areas where the at least two food products will be cooked within the single cooking compartment;
        displaying at least two virtual tokens corresponding to the at least two cooking programs on the virtual token board, wherein the overlap in cooking time results from placing the at least two virtual tokens in the virtual token board at least partly parallel to a time line of the virtual token board;
        selecting a leading virtual climate token from the at least two virtual tokens wherein the selected leading virtual climate token takes priority as a master virtual climate token of the at least two virtual tokens, and wherein selecting the leading virtual climate token includes changing from a current leading virtual climate token to a new leading virtual climate token for planning conduction of the at least two cooking programs;

determining a climate of the single cooking compartment of the cooking device based on a climate associated with the leading virtual climate token; and causing the cooking compartment to adjust to the determined climate based on the new leading virtual climate token and cook the at least two food products.

2. The cooking device of claim 1, wherein prior to displaying the at least two virtual tokens in the virtual token board, displaying the at least two virtual tokens on a virtual token bar.

3. The cooking device of claim 1, wherein a climate or climate phase associated with each virtual token is determined by at least one of temperature, humidity, flow speed, and/or pressure associated with the cooking program corresponding to thereto and is illustrated or displayed on said virtual token or via a pop up window on at least one of a display, the virtual token board or a virtual token bar.

4. The cooking device of claim 1, wherein the climate associated with the leading virtual climate token comprises one or more climate phases, with each phase being illustrated or displayed on the virtual token board when the leading virtual climate token is placed on the virtual token board.

5. The cooking device of claim 3 or 4, wherein the climate or climate phase is illustrated or displayed via a coloring, a brightness, a color veil, and/or a labeling with ° C. and/or percentage moisture.

6. The cooking device of claim 1, wherein the processor is further configured to mark a climate or climate phases associated with the at least one other virtual token of the at least two virtual tokens, other than the leading virtual climate token, displayed in the virtual token bar or the virtual token board depending on the climate or climate phases associated with the leading virtual climate token.

7. The cooking device of claim 1, wherein the processor is further configured to provide feedback to a user in response to the at least one other virtual token of the at least two virtual tokens, other than the leading virtual climate token, being placed into or replaced within the virtual token board in order to provide information on whether the at least one other virtual token is being placed appropriately in relation to the leading virtual climate token.

8. The cooking device of claim 7, where the feedback is provided to the user through optical, acoustic, and/or animated signals.

9. The cooking device of claim 7, wherein the processor is further configured to mark a problematic virtual token of the at least one other virtual token by zooming on, coloring, flashing or arranging a window around the problematic virtual token, wherein the climate or at least one climate phase of a plurality of climate phases of the problematic virtual token is not matching with the climate or climate phases determined by the leading virtual climate token.

10. The cooking device of claim 7, wherein the feedback is provided as a symbol, pictogram, or emoji, wherein the feedback includes a smiley or a thumbs up if the feedback is positive.

11. The method of claim 7, wherein the feedback is provided as a symbol, pictogram, or emoji, wherein the feedback includes a flushed face or thumbs down if the feedback is negative.

12. The cooking device of claim 1, wherein a selection and/or change of the leading virtual climate token is achieved by a single touch or a plurality of consecutive touches of the virtual token to become the leading virtual climate token.

13. The cooking device of claim 1, wherein in response to the at least two virtual tokens being selected and displayed in the virtual token bar, a proposal for arranging the tokens on the virtual token board is provided, in dependence on the leading virtual climate token.

14. The cooking device of claim 13, wherein the selection of the leading virtual climate token can be allocated to a specific time window.

15. The cooking device of claim 13, wherein the proposal is provided optically, acoustically, or via animation.

16. The cooking device of claim 1, wherein in response to the at last two virtual tokens being placed on the virtual token board, a proposal for a rearrangement of virtual tokens on the virtual token board is provided as response to the provision of the leading virtual climate token.

17. The cooking device of claim 16, wherein the proposal is provided optically, acoustically, or via animation.

* * * * *